United States Patent
Takaoka et al.

(10) Patent No.: US 7,584,413 B2
(45) Date of Patent: Sep. 1, 2009

(54) ELECTRONIC DOCUMENT BINDER BUILDER

(75) Inventors: Makoto Takaoka, Kanagawa (JP); Yasumasa Sakai, Kanagawa (JP)

(73) Assignee: Canon Kabuhsiki Kaisha, Tokyo (JP)

( * ) Notice: Subject to any disclaimer, the term of this patent is extended or adjusted under 35 U.S.C. 154(b) by 394 days.

(21) Appl. No.: 09/948,603

(22) Filed: Sep. 10, 2001

(65) Prior Publication Data

US 2002/0059337 A1    May 16, 2002

(30) Foreign Application Priority Data

Sep. 12, 2000   (JP)   ............... 2000-277203
Sep. 12, 2000   (JP)   ............... 2000-277205

(51) Int. Cl.
   *G06F 17/00* (2006.01)
(52) U.S. Cl. ............... 715/209; 715/255; 715/205
(58) Field of Classification Search ............ 715/530, 715/500, 513, 501.1, 522–523, 234, 200, 715/205, 248, 255, 209; 709/206–207
   See application file for complete search history.

(56) References Cited

U.S. PATENT DOCUMENTS

| | | | | |
|---|---|---|---|---|
| 5,802,381 A | * | 9/1998 | Matsumoto et al. | ......... 715/517 |
| 5,950,215 A | * | 9/1999 | Tabuchi | ......... 715/515 |
| 6,028,603 A | * | 2/2000 | Wang et al. | ......... 715/776 |
| 6,084,598 A | * | 7/2000 | Chekerylla | ......... 345/441 |
| 6,237,010 B1 | * | 5/2001 | Hui et al. | ......... 715/502 |
| 6,246,411 B1 | * | 6/2001 | Strauss | ......... 715/863 |
| 6,301,586 B1 | * | 10/2001 | Yang et al. | ......... 707/104.1 |
| 6,351,741 B1 | * | 2/2002 | Flenniken | ......... 707/2 |
| 6,538,760 B1 | * | 3/2003 | deBry et al. | ......... 358/1.15 |
| 6,549,302 B1 | * | 4/2003 | Takeda et al. | ......... 358/1.9 |
| 6,631,205 B1 | * | 10/2003 | Melen et al. | ......... 382/154 |
| 6,782,387 B1 | * | 8/2004 | Kumashio | ......... 707/10 |
| 6,856,989 B1 | * | 2/2005 | Zhou et al. | ......... 707/9 |
| 2002/0191213 A1 | * | 12/2002 | Laverty et al. | ......... 358/1.15 |
| 2003/0079177 A1 | * | 4/2003 | Brintzenhofe et al. | ......... 715/500 |
| 2006/0082820 A1 | * | 4/2006 | Anderson et al. | ......... 358/1.15 |

* cited by examiner

*Primary Examiner*—Thu Huynh
(74) *Attorney, Agent, or Firm*—Fitzpatrick, Cella, Harper & Scinto

(57) ABSTRACT

A plurality of kinds of electronic source documents are held. An electronic binder builder composes an integrated electronic document on the basis of the electronic documents of the plurality of kinds of electronic source documents held. For the integrated electronic document, a desired electronic source document page is selected from electronic source document pages. The selected material page is edited, and the compositions of the electronic source documents and integrated electronic document are controlled on the basis of the editing result.

22 Claims, 25 Drawing Sheets

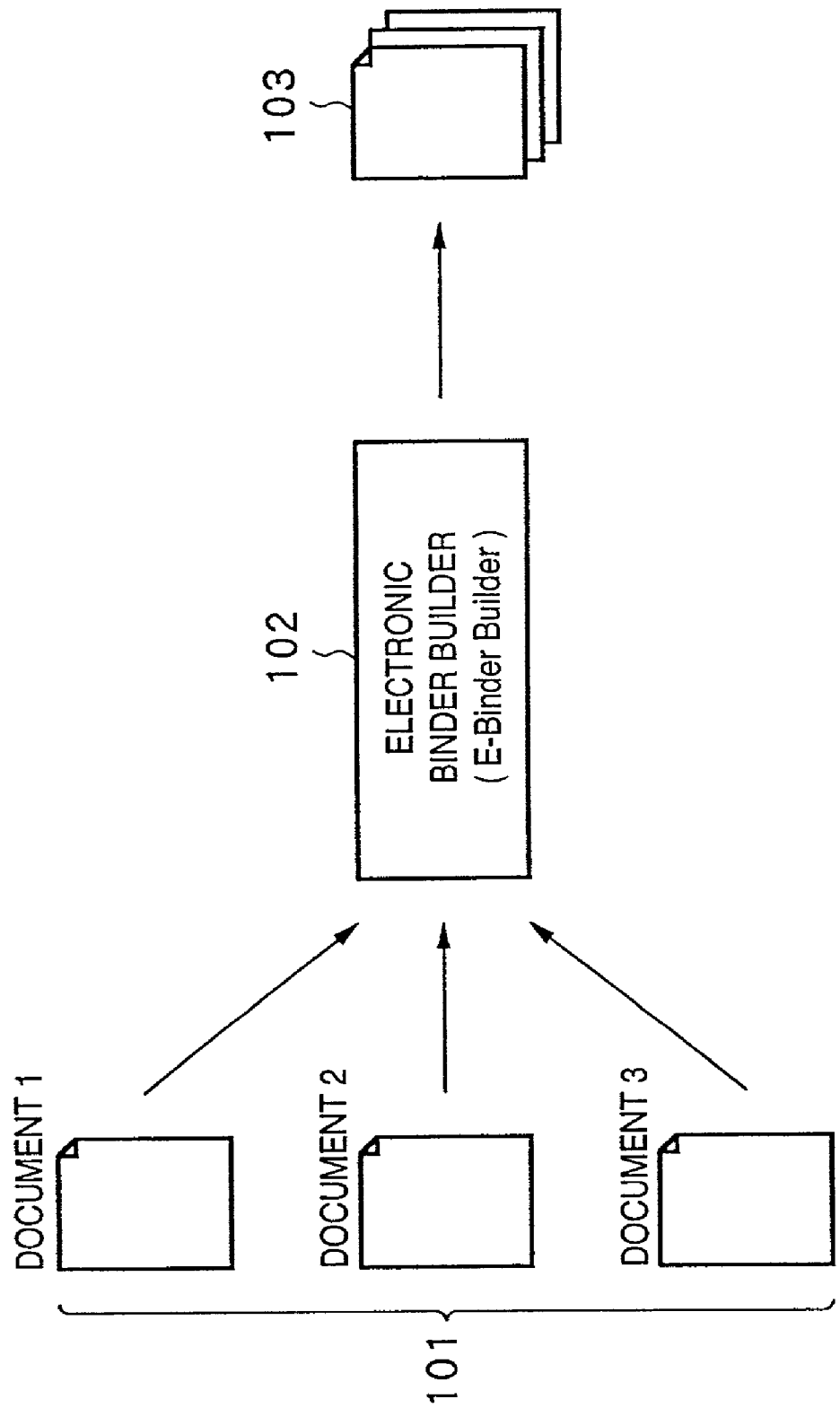

FIG. 2B

```xml
<?xml version="1.0"encoding="Shift_JIS"?>
<EBINDER>
 <EBINDER_INFO>
  <TITLE>PAF</TITLE>
  <CREATOR>Taro Suzuki</CREATOR>
  <CREATOR>Jun Tanaka</CREATOR>
  <CREATOR>Ichiro Sato</CREATOR>
  <DATE>1999-07-28</DATE>
 </EBINDER>_INFO>
 <MATERIAL files="2">
  <EFILEhref="office¥ppt0000¥F_c01.ppt"composedpagefile="pimg¥efile0001.pdf"
    type="pdf"totalpage="2"id="ef0001">
   <EFILE_INFO datatype="PowerPoint2000">
    <TITLE>Sample PowerPoint</TITLE>
    <CREATOR>Taro Suzuki</CREATOR>
   </EFILE_INFO>
   <EPAGES>
      <EPAGE page="1"thumbnail="Material¥ef0000¥thumb1.bmp"/>
      <EPAGE page="2"thumbnail="Material¥ef0000¥thumb2.bmp"/>
   </EPAGES>
  </EFILE>
  <EFILE href="office¥word0000¥28J_ApplHTML.doc"
      composedpagefile="pimg¥efile0002.pdf" type="pdf"totalpage="3"
      id="ef0002">
   <EFILE_INFO datatype="Word2000">
    <TITLE>Microsoft Office2000 and HTML</TITLE>
    <CREATOR>Microsoft</CRETOR>
   </EFILE_INFO>
   <DOC_SUMMARY>Office2000 White paper</DOC_SUMMARY>
   <EPAGES>
      <EPAGE page="1"thumbnail="office¥word0000¥thumb1.bmp"/>
      <EPAGE page="2"thumbnail="office¥word0000¥thumb2.bmp"/>
      <EPAGE page="3"thumbnail="office¥word0000¥thumb3.bmp"/>
   </EPAGES>
  </EFILE>
 </MATERIAL>
 <PAGEINDEX>
    <INDEX page="1"idref="ef0002"efilepage="3"/>
    <INDEX page="2"idref="ef0001"efilepage="2"/>
    <INDEX page="3"idref="ef0002"efilepage="2"/>
 </PAGEINDEX>
 <BOOKBINDING href="bind¥bind.tiff"type="tiff">
    <BPAGE page="1"thumbnail="bind¥page1.png"/>
    <BPAGE page="2"thumbnail="bind¥page2.png"/>
    <BPAGE page="3"thumbnail="bind¥page3.png"/>
 </BOOKBINDING>

</EBINDER>
```

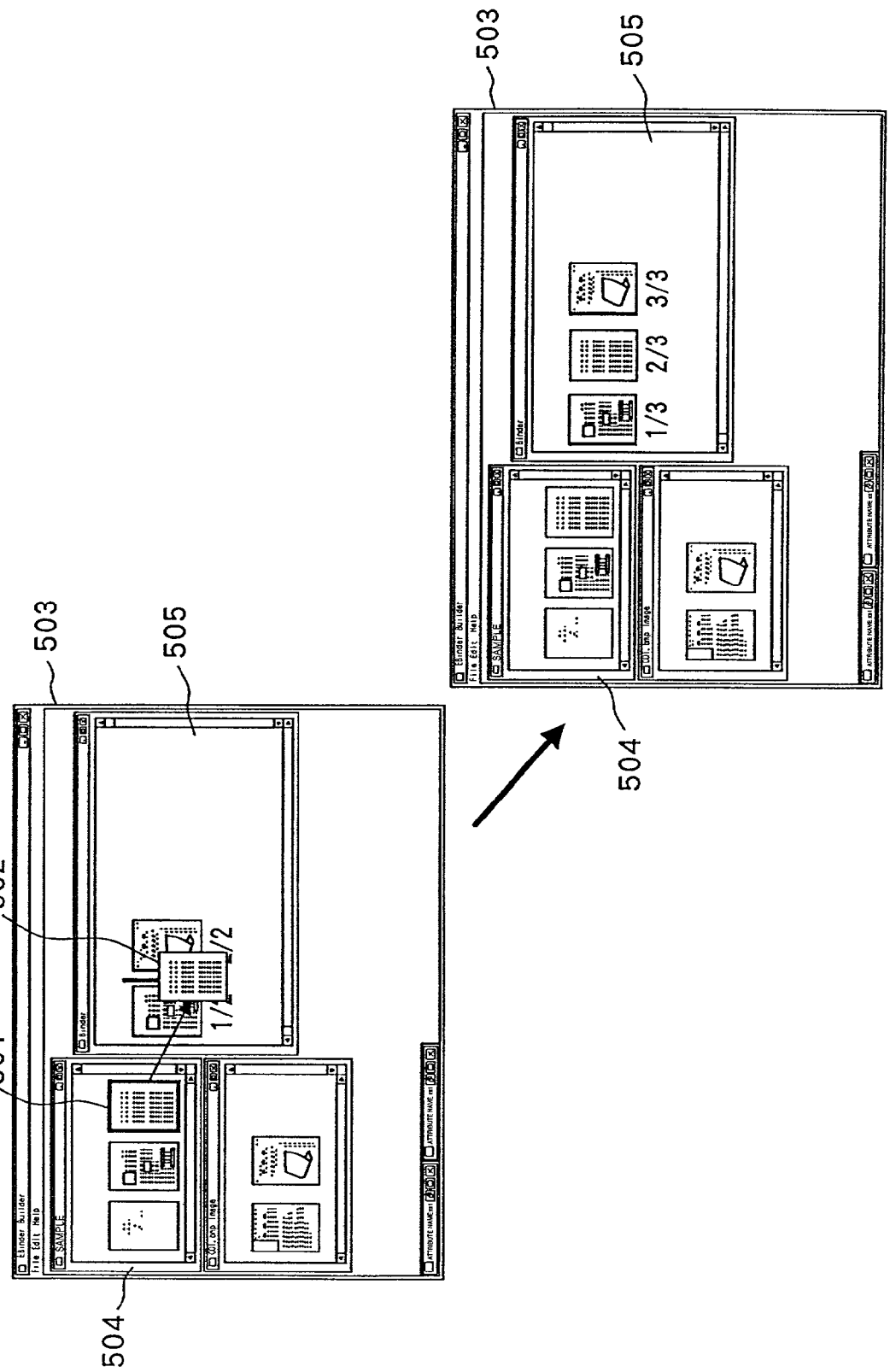

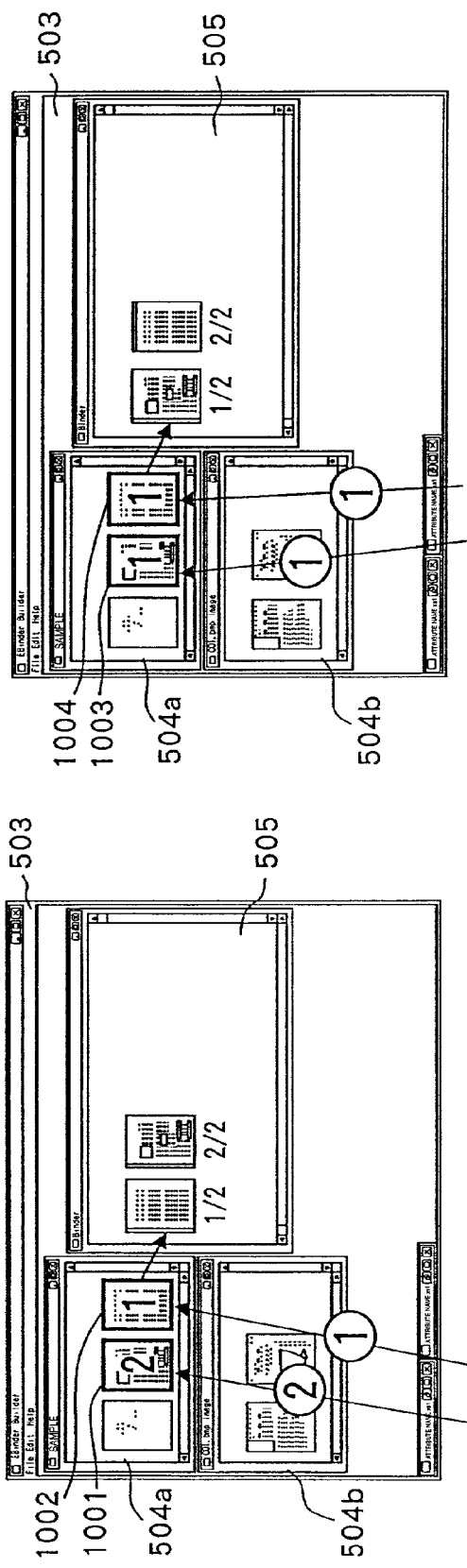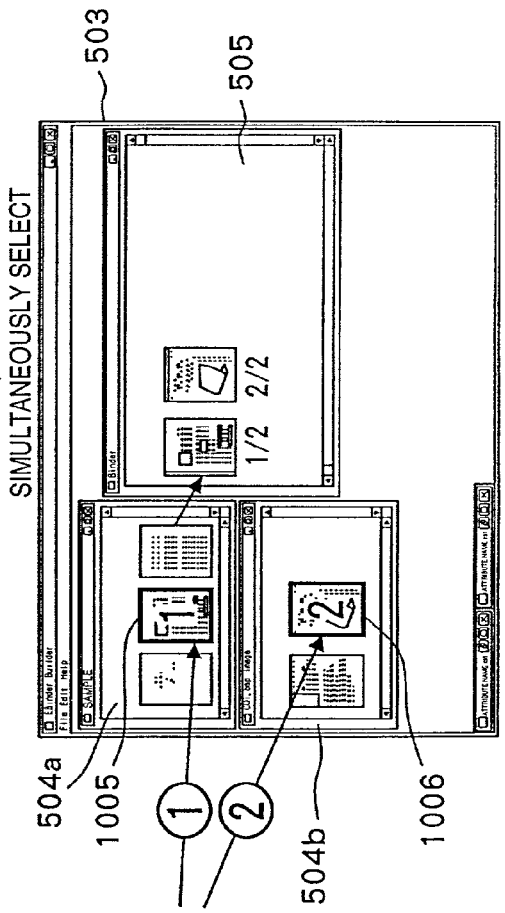

FIG. 12
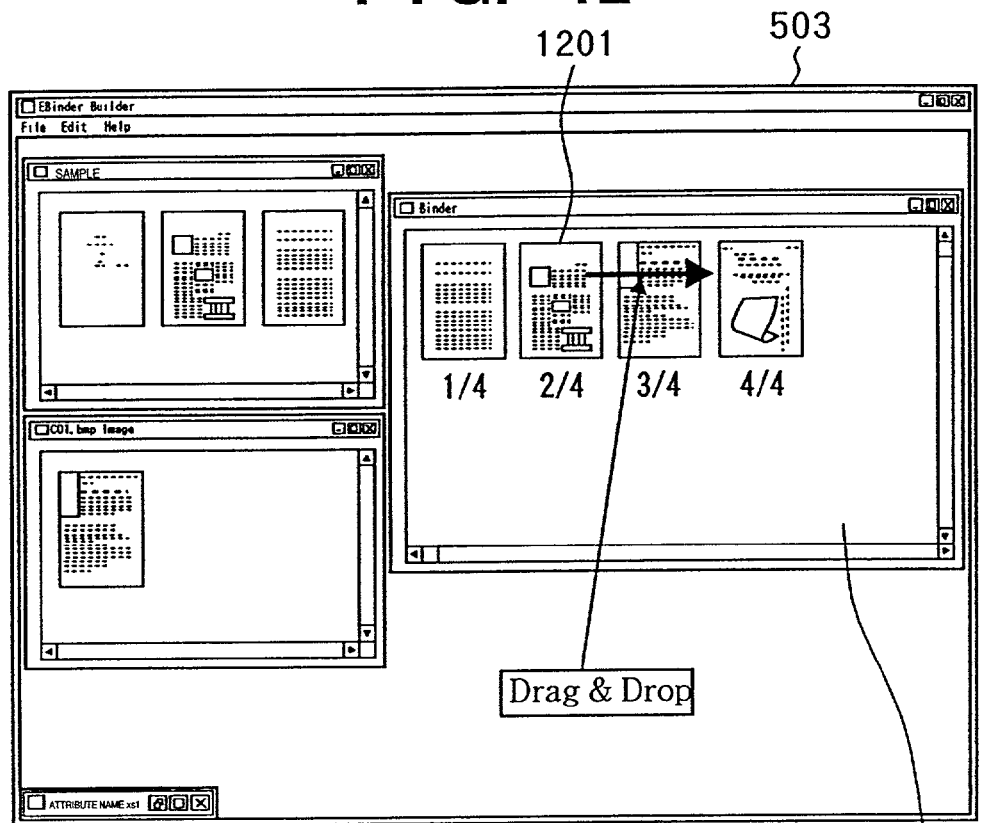
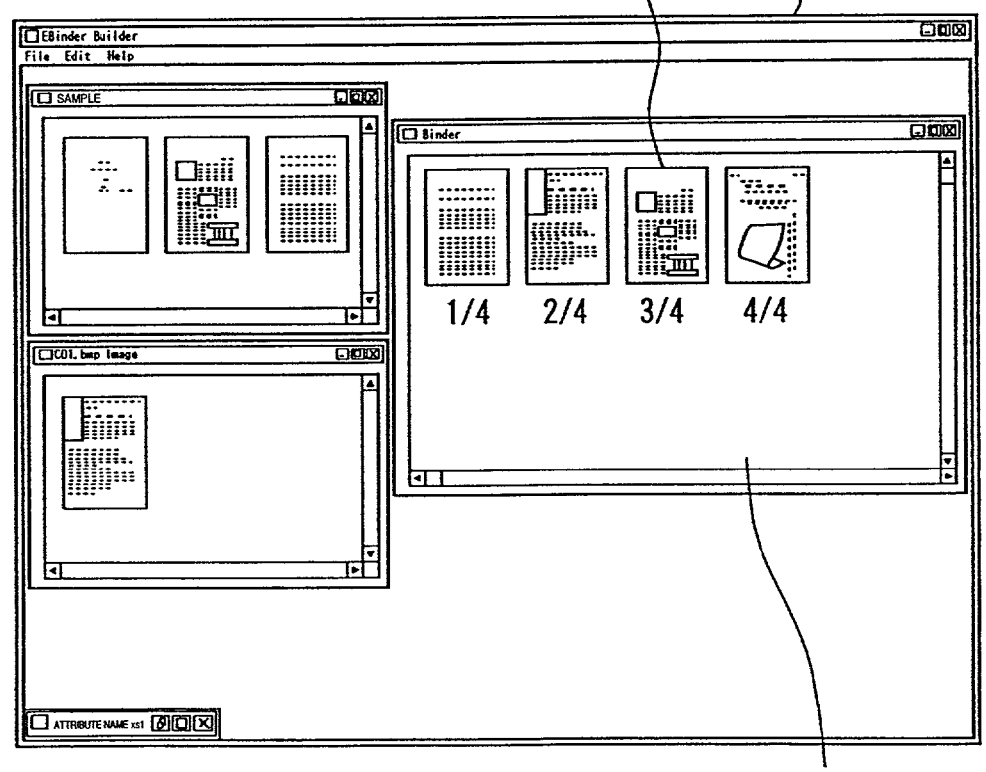

FIG. 16
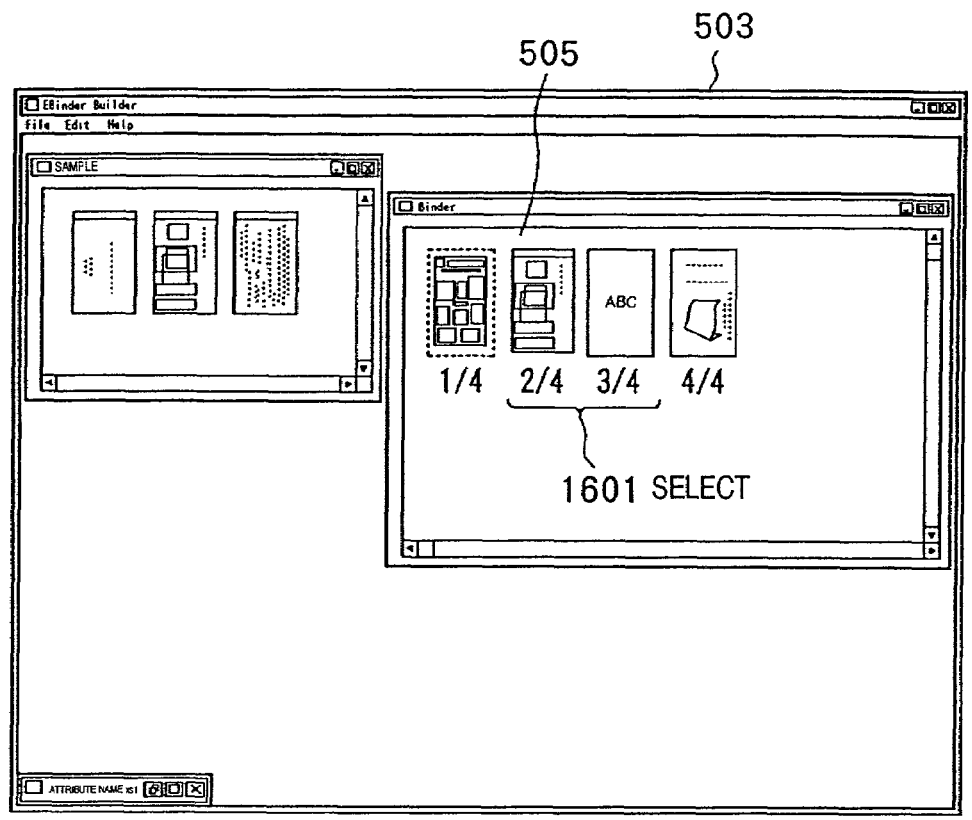
90° CLOCKWISE ROTATION
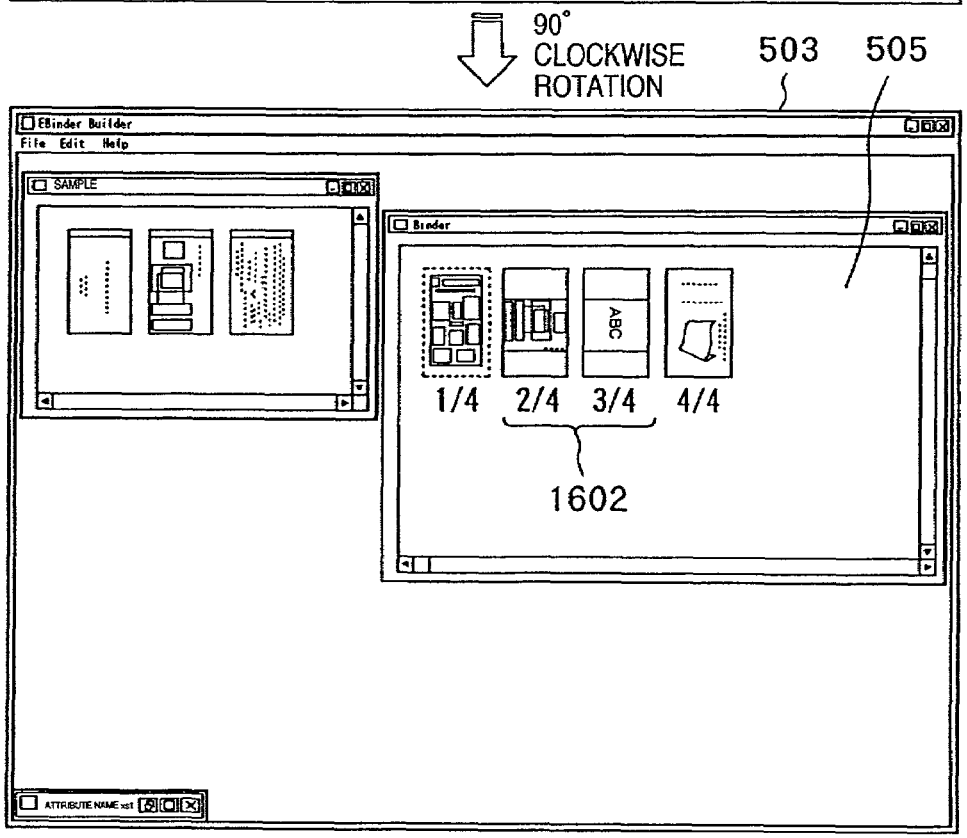

FIG. 17
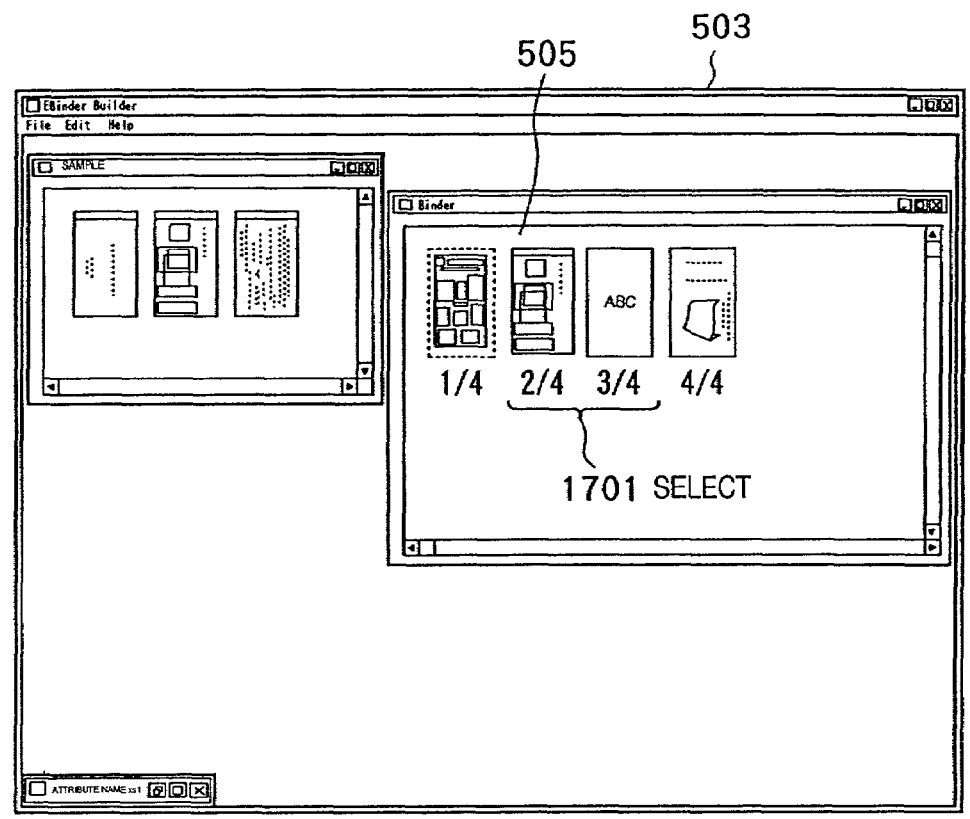
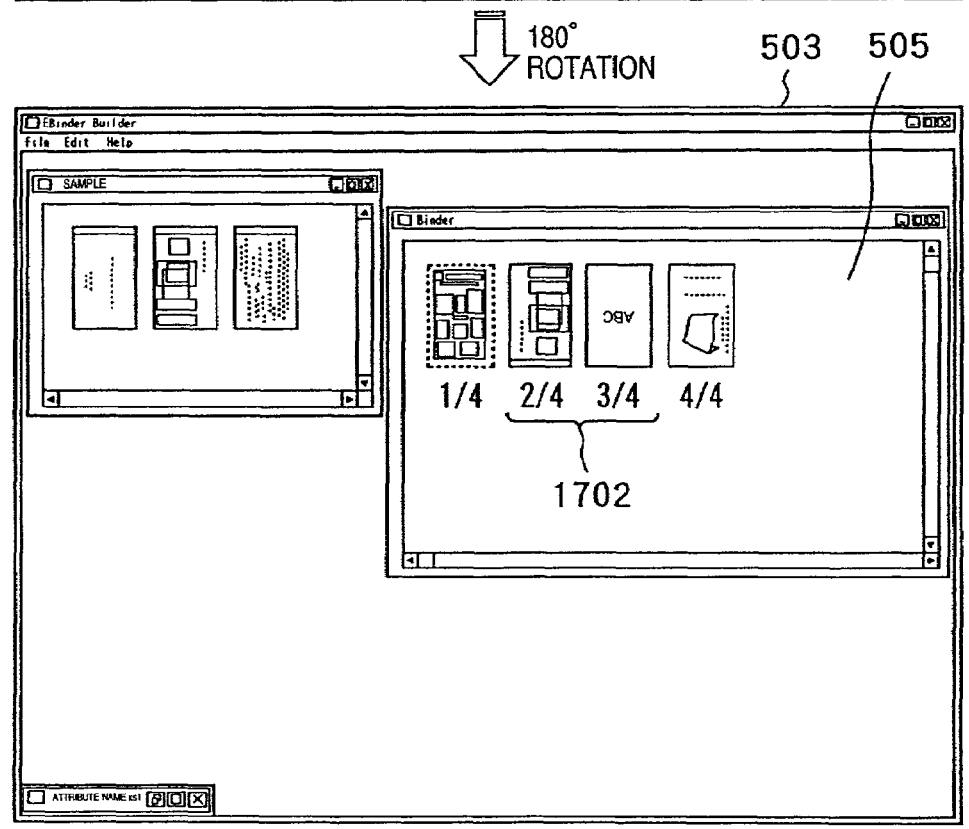

→ 90° CLOCKWISE
→ 90° COUNTERCLOCKWISE
→ 180°

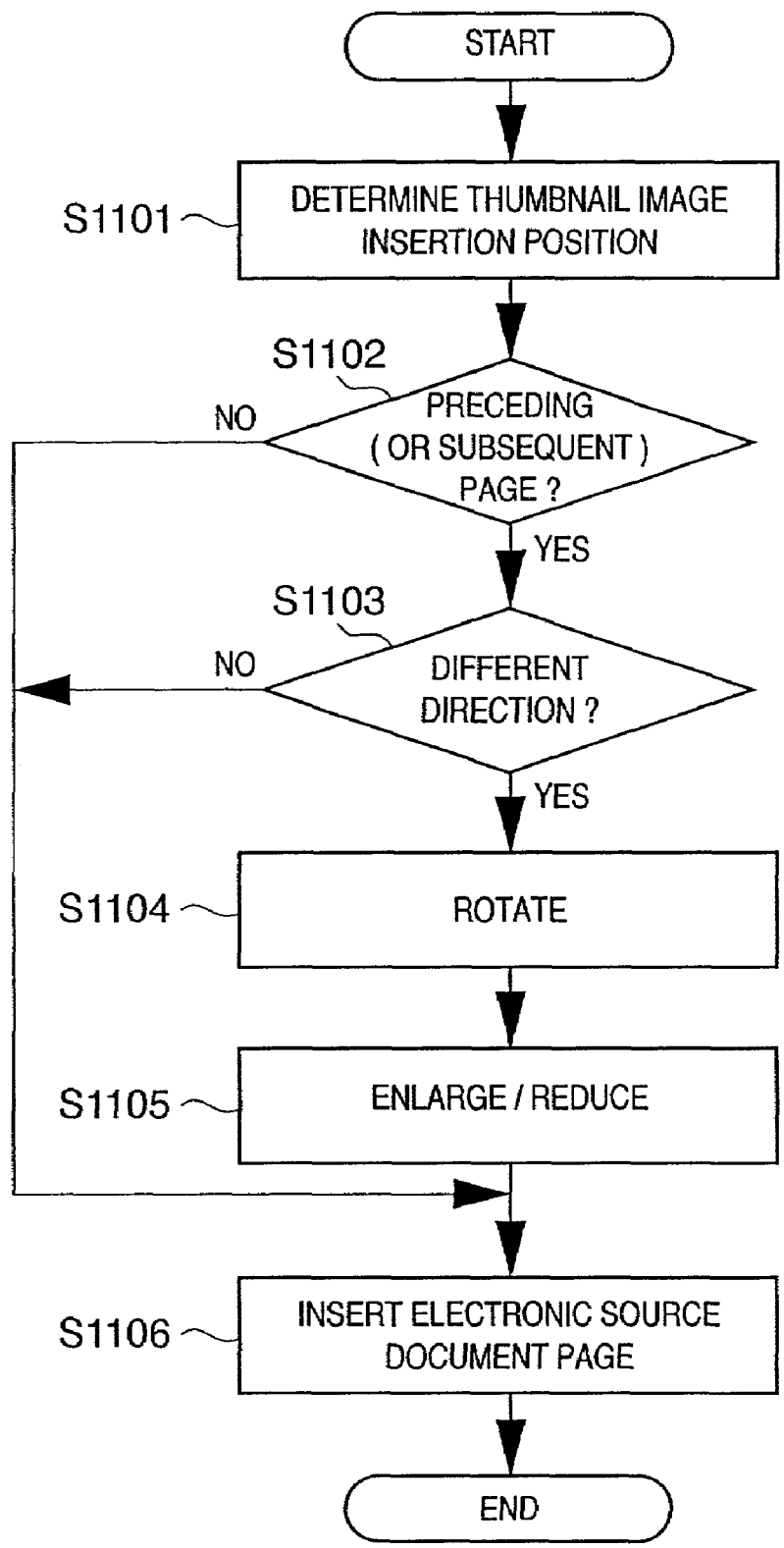

ELECTRONIC DOCUMENT BINDER BUILDER

FIELD OF THE INVENTION

The present invention relates to an information processing apparatus for composing an integrated electronic document from a plurality of kinds of electronic source documents, a method therefor, and a computer-readable memory.

BACKGROUND OF THE INVENTION

Business entities try to promote reuse of documents by introducing a document management system. Products at early stage receive a paper document as an image using a scanner and registers and saves the image. Recently, many electronic documents are created by personal computers, and even they can also be registered and saved. In addition, recently, arbitrary pages can be extracted from a plurality of registered electronic documents and bound like a binder to form one electronic document. This will be referred to as an electronic binder hereinafter.

To realize such an electronic binder, conventionally, a plurality of different electronic documents are temporarily converted into a unitary electronic document format, and the converted electronic documents are edited to compose a desired generated electronic document. In this method, new electronic documents, which are completely separated from electronic source documents as materials, are edited to compose a generated electronic document. When the electronic source documents are changed, the changed electronic source documents are temporarily deleted from the generated electronic document, and then the changed electronic source documents are input again. If the degree of editing is high, a considerable labor for delete, move, and the like or many errors occur. As described above, if a material and generated document are completely separated, a labor is required to restore the original document.

SUMMARY OF THE INVENTION

The present invention has been made in consideration of the above situation, and has as its object to provide an information processing apparatus capable of creating one integrated electronic document from a plurality of different electronic source documents and easily editing the electronic document while maintaining the relationship between the electronic source documents and the integrated electronic document, a method therefor, and a computer-readable memory.

According to the present invention, the foregoing object is attained by providing an information processing apparatus for composing an integrated electronic document composed of a plurality of kinds of electronic source documents, comprising:

holding means for holding the plurality of kinds of electronic source documents;

selection means for selecting a desired electronic source document page from electronic source document pages of the plurality of kinds of electronic source documents held by said holding means;

composition means for composing the integrated electronic document on the basis of the electronic source document page selected by said selection means;

editing means for editing each page of the integrated electronic document; and control means for controlling the compositions of the electronic source documents and integrated electronic document on the basis of an editing result by said editing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a view showing the concept of a document management system according to an embodiment;

FIG. 2B is a view showing an example of XML description of the generated electronic document composed by the electronic binder builder of the embodiment;

FIG. 9 is a view showing still another operation example of the electronic binder builder of the embodiment;

FIG. 10A is a view showing still another operation example of the electronic binder builder of the embodiment;

FIG. 10B is a view showing still another operation example of the electronic binder builder of the embodiment;

FIG. 10C is a view showing still another operation example of the electronic binder builder of the embodiment;

FIG. 12 is a view showing still another operation example of the electronic binder builder of the embodiment;

FIG. 16 is a view showing still another operation example of the electronic binder builder of the embodiment;

FIG. 17 is a view showing still another operation example of the electronic binder builder of the embodiment;

FIG. 21 is a flow chart showing processing of adding an electronic source document page to a generated electronic document of Another Embodiment 2.

DETAILED DESCRIPTION OF THE PREFERRED EMBODIMENTS

Figure 2A:
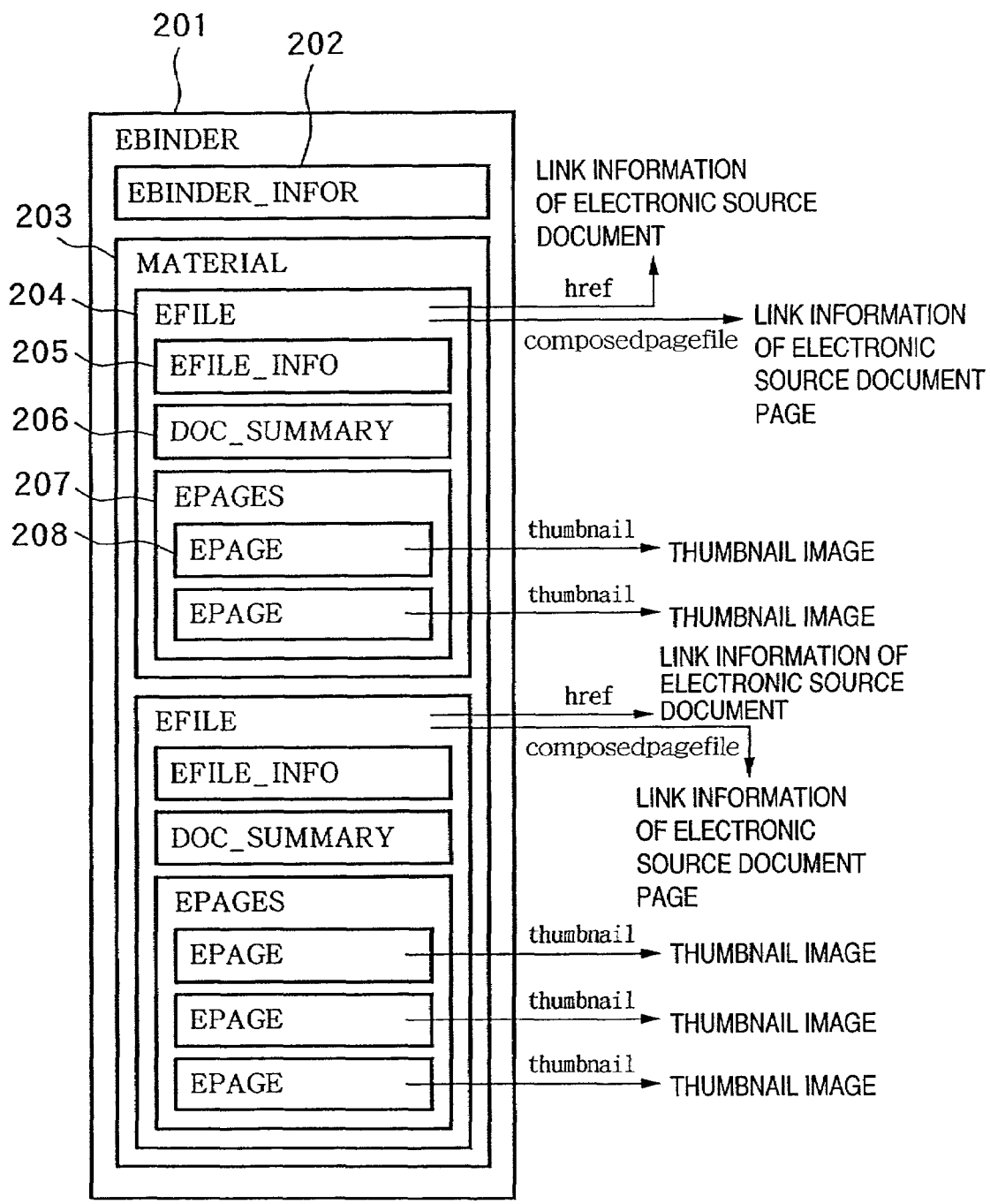
FIG. 2A is a view showing the format block structure of a generated electronic document composed by an electronic binder builder of the embodiment.

Preferred embodiments of the present invention will be described below in detail with reference to the accompanying drawings.

FIG. 1 is a view showing the concept of a document management system according to an embodiment.

Referring to FIG. 1, reference numeral 101 denotes electronic documents created by different application software programs. Assume that the electronic documents include electronic document 1 created by Microsoft Word, electronic document 2 created by Microsoft PowerPoint, and electronic document 3 having an HTML format which is used by an image read with a scanner or in the Internet. An electronic binder builder (e-binder builder) 102 can bind pages of the electronic documents 1 to 3 to compose one generated electronic document 103.

An example of the generated electronic document composed by the electronic binder builder 102 of the document management system of this embodiment will be described next with reference to FIGS. 2A and 2B.

FIG. 2A is a view showing the format block structure of a generated electronic document composed by the electronic binder builder of the embodiment, and FIG. 2B is a view showing a detailed example of XML description thereof.

Figure 4:
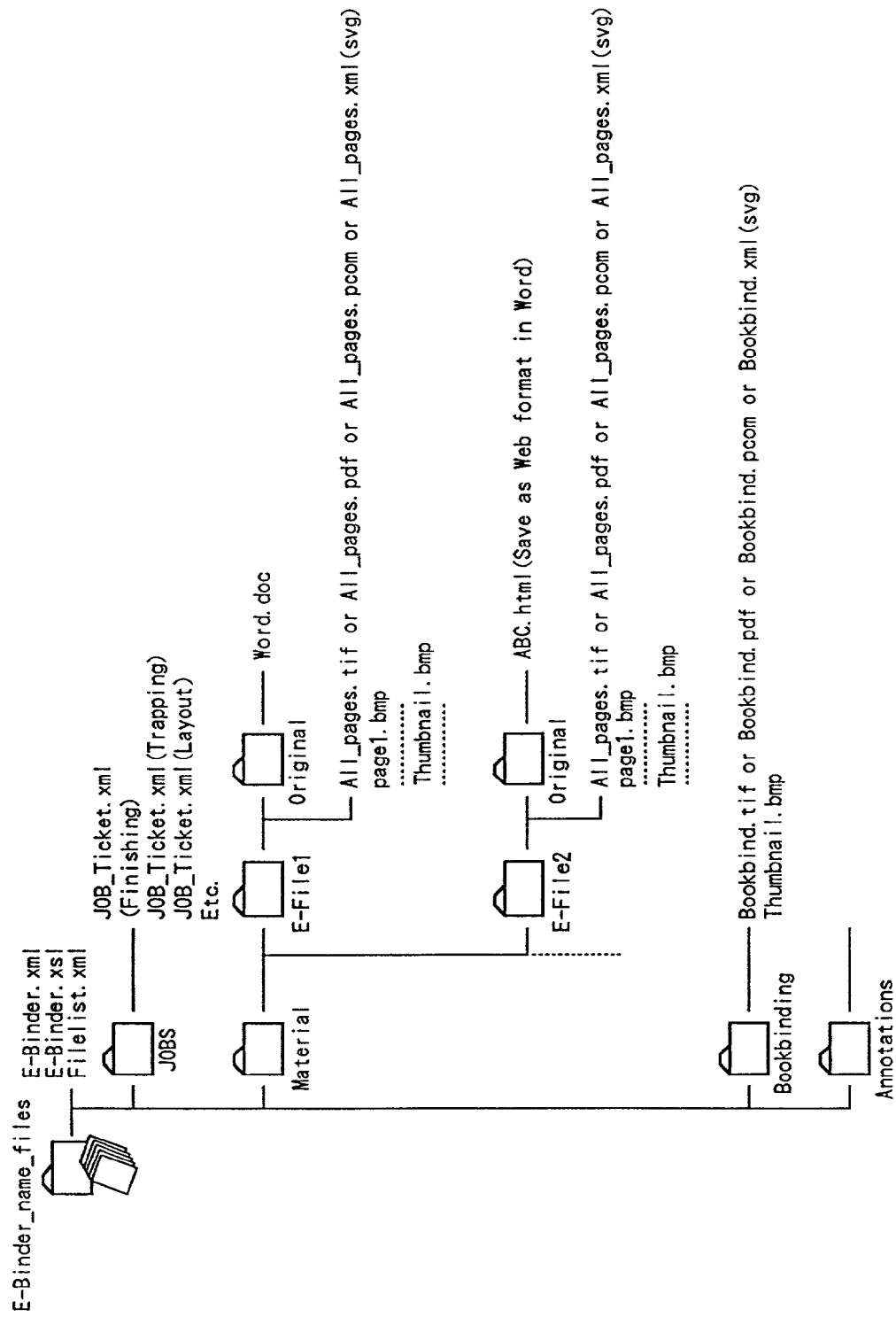
FIG. 4 is a view showing the arrangement of folders and files of the generated electronic document of the embodiment.

In the present invention, a generated electronic document is composed using an XML (extensional Markup Language) description. A generated electronic document is composed of a plurality of kinds of electronic source documents created by different application software programs. As the basic composition, a document E-Binder.xml is formed as a Top description, a predetermined description is done therein, and elements (contents) such as relational files are indicated by external link. The locations of the elements indicated by the external link must be known. FIG. 4 shows the arrangement of folders and files of the generated electronic document. The holding positions of the external link elements can be known as relative positions from E-Binder.xml as the Top document.

Referring to FIG. 2B, <?xml version="1.0" encoding="Shift_JIS"?> is the description of declaration at the start.

An EBINDER portion (201) in FIG. 2A indicates the start of the document. A portion between <EBINDER> and </EBIDNER> in FIG. 2B is the main body of the document.

An EBINDER_INFOR portion (202) in FIG. 2A is a portion that holds the meta information (management information) of the document. A portion between <EBINDER_INFO> and </EBINDER_INFO> holds the meta information. Especially, pieces of meta information <TITLE> to </TITLE> representing the file name, <CREATOR> to </CREATOR> representing the creator name, and <DATE> to </DATE> representing the date of creation are held here.

A MATERIAL portion (203) in FIG. 2A is a portion that holds the information of electronic source documents. A portion between <MATERIAL files="2"> and </MATERIAL> holds the information, in which files= indicates the number of electronic source documents, and two files are held here.

An EFILE portion (204) in FIG. 2A is a portion that holds the information of one electronic source document, i.e., the information obtained by converting an electronic source document into electronic document pages. A portion between <EFILE href="office¥ppt0000¥F_c01.ppt" composedpagefile="pimg¥efile00001.pdf" type="pdf" totalpage="2" id="ef0001"> and </EFILE> holds the information. Hereinafter, "¥" corresponds to "\" (backslash). Here, href= indicates the link information of the electronic source document, composedpagefile= indicates the link information of a file in which the pages of the electronic source document are put together, and type= indicates the file format. In this example, the PDF format of Adobe is indicated. Alternatively, MultiPageTIFF or the like, that is a format capable of storing a plurality of images, can be set. In addition, totalpage= indicates the number of pages of the electronic source document, and id= indicates the identification number.

An EFILE_INFO portion (205) in the EFILE portion (204) shown in FIG. 2A holds the management information of an electronic source document. A portion between <EFILE_INFO datatype="PowerPoint2000"> and </EFILE_INFO> holds the management information. In this case, datatype= indicates the type of the electronic source document, which represents PowerPoint2000. <TITLE> to </TITLE> representing the file name and <CREATOR> and </CREATOR> representing the creator name hold the management information.

A DOC_SUMMARY portion (206) in FIG. 2A holds the summary information of an electronic source document. This portion holds a text obtained by summarizing a full text using a summarizing engine so that the summary of the material contents can be known. This portion is omitted in FIG. 2B.

An EPAGES portion (207) in FIG. 2A saves documents (electronic source document pages) obtained by changing an electronic source document into information pages. For example, for the electronic source document of Word, pages are determined only in displaying or printing the document. The EPAGES portion (207) saves the determined electronic source document pages. A portion between <EPAGE> and </EPAGE> saves electronic source document pages. Actually, the following <EPAGE . . . /> portion such as <EPAGE page="1" thumbnail="Material¥ef0000¥thumb1.bmp"/> or <EPAGE page="2" thumbnail="Material¥ef0000¥thumb2.bmp"/> holds an electronic source document page. Here, page= is information representing the ordinal number of a page in the entire electronic source document, and thumbnail= is information that holds the thumbnail image (reduced image) of the page. The next description also indicates the information of the electronic source document page. In this way, the page bitmapping information of an electronic source document (the information of an electronic source document page) is held. The bitmapped document of an electronic source document page, e.g., an image bitmapped to A4 size is also held here.

<EPAGE page="1" thumbnail="Material¥ef0000¥thumb1.bmp" Pagefile="office¥ppt0000¥page00001.bmp" type="bmp"/>

In this example, pagefile= holds the thumbnail image of the first page, and type= indicates the holding file format. In this example, the electronic source document page is held by an image file format "bmp". However, PDF or any other compression file format may be used. The necessary condition is that each page of a document can be held. The number of <EPAGE . . . /> portions is determined by the number of pages of an electronic source document.

Figure 3A:
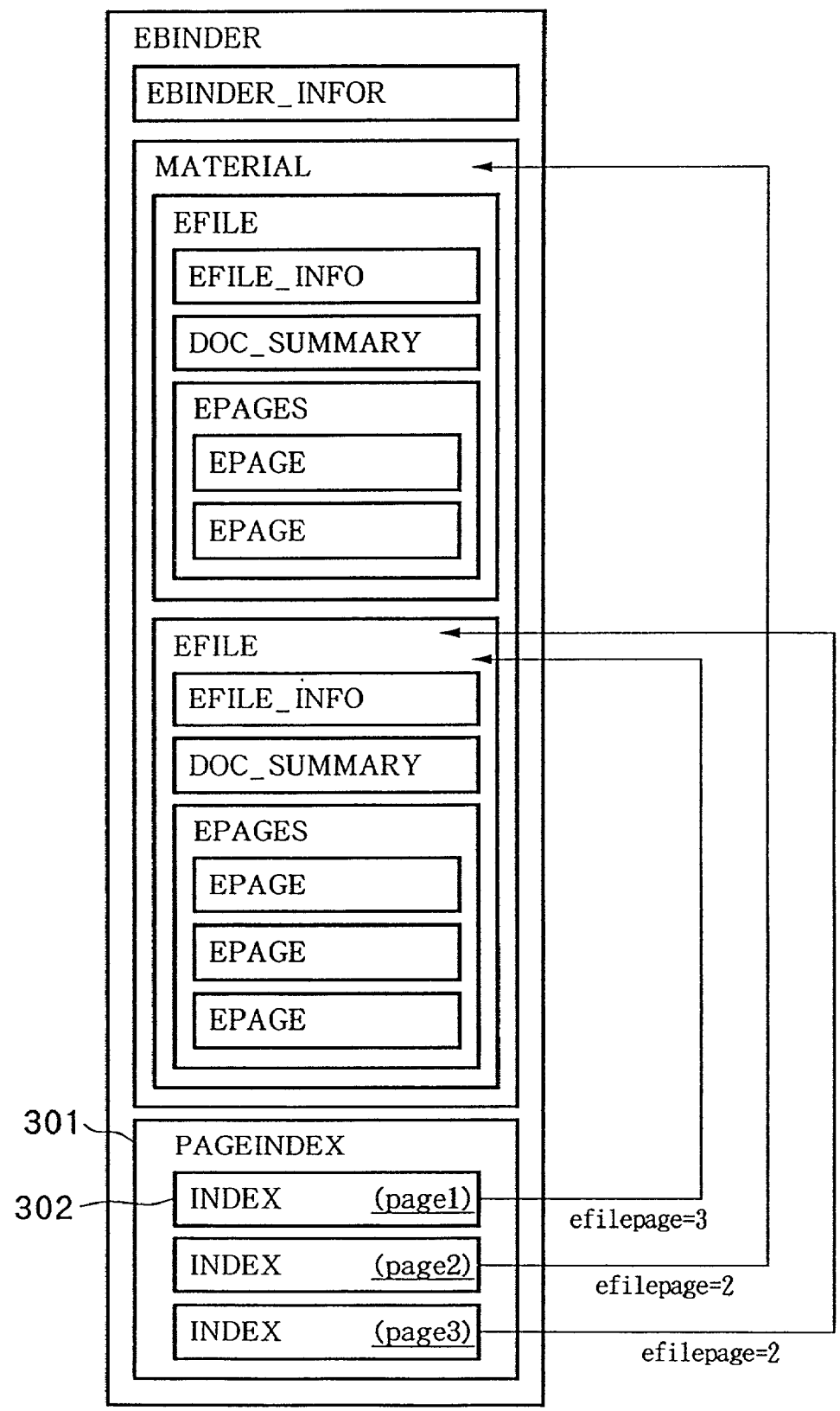
FIG. 3A is a view showing the format block structure of another generated electronic document composed by the electronic binder builder of the embodiment.

FIG. 3A is a view showing the format block structure of another generated electronic document in which necessary electronic source document pages are selected from electronic source documents and held.

A PAGEINDEX portion (301) in FIG. 3A holds information that indicates the position of each page-bitmapped portion of electronic source documents. For a generated electronic document, the ids and page numbers of electronic source documents are managed, and page images are read out in that order, thereby composing a continuous electronic document. A portion between <PAGEINDEX> and </PAGEINDEX> in the description example shown in FIG. 2B is a description for managing and saving the pages of the generated electronic document. In this portion, <INDEX page="1" idref="ef0002" efilepage="3" />
<INDEX page="2" idref="ef0001" efilepage="2"/>and the like are described. Each <INDEX . . . /> indicates a page of the generated electronic document. Here, page= indicates a page of the generated electronic document, idref= indicates the id of an electronic source document, and efilepage= indicates a use page number of the electronic source document corresponding to id. In the above description example, pages separately designated from two electronic source documents are used.

The format block structure of a generated electronic document described above can simultaneously save electronic source documents, electronic source document pages, and generated electronic document. Hence, in editing, the original electronic documents of the electronic source documents can be referred to, and pages can be replaced again. An electronic source document page can be an imaged document or a document with the PDF or XML format. The format can be switched in accordance with the software environment for forming electronic source document pages.

Operation windows related to processing of the electronic binder builder 102 will be described next with reference to FIG. 5.

Figure 5:
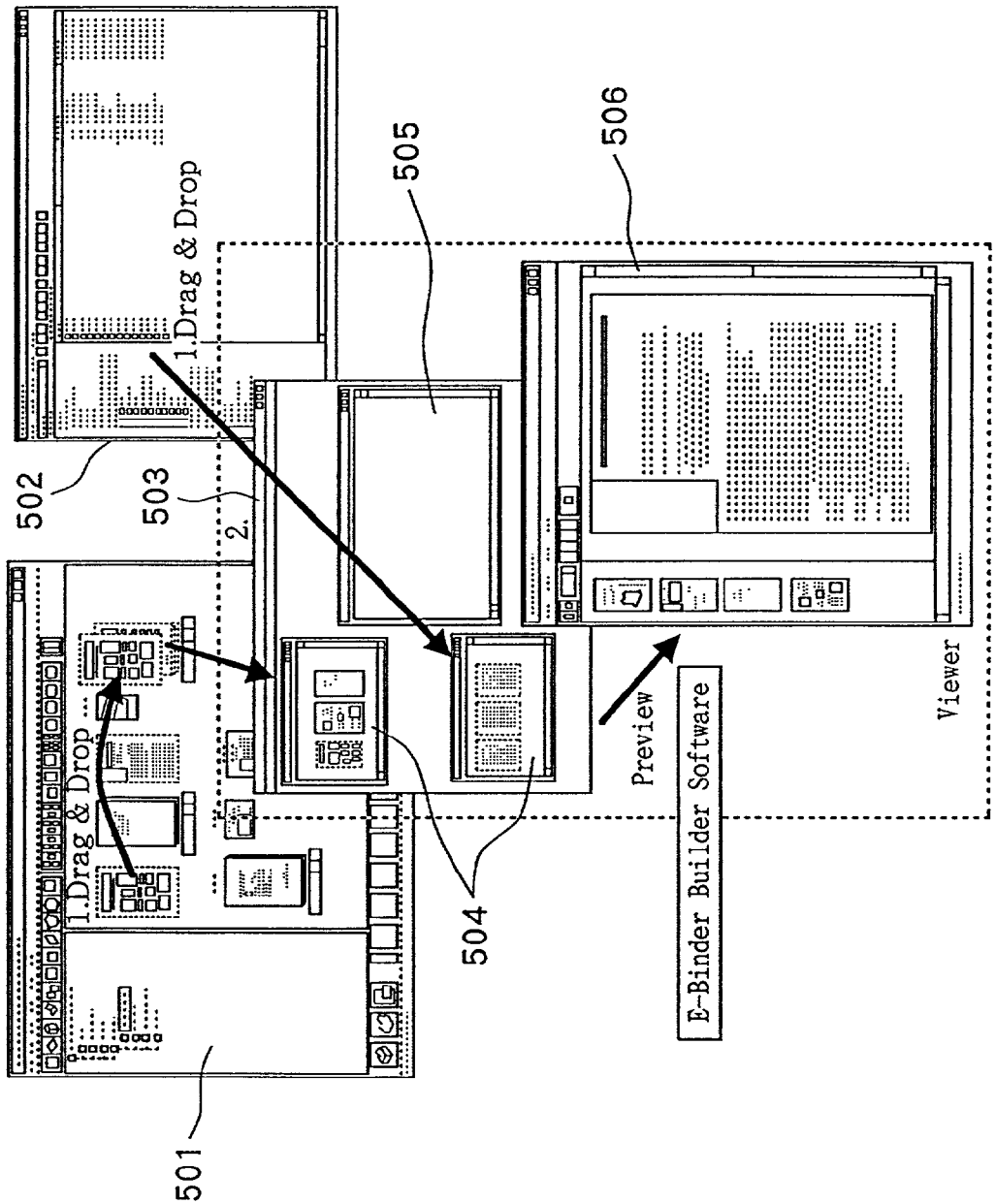
FIG. 5 is a view showing operation windows related to processing of the electronic binder builder of the embodiment.

FIG. 5 is a view showing operation windows related to processing of the electronic binder builder of this embodiment.

Reference numeral 501 denotes a document management software window; 502, a file management window managed on the OS of the computer; 503, a software (e-binder builder) window of the electronic binder builder 102; 504, collection windows for managing an electronic source documents, respectively; 505, a composed window for managing a generated electronic document; and 506, a display software (viewer) window for displaying a generated electronic document.

Generated electronic document creation processing will be described next with reference to FIGS. 5 and 6.

Figure 6:
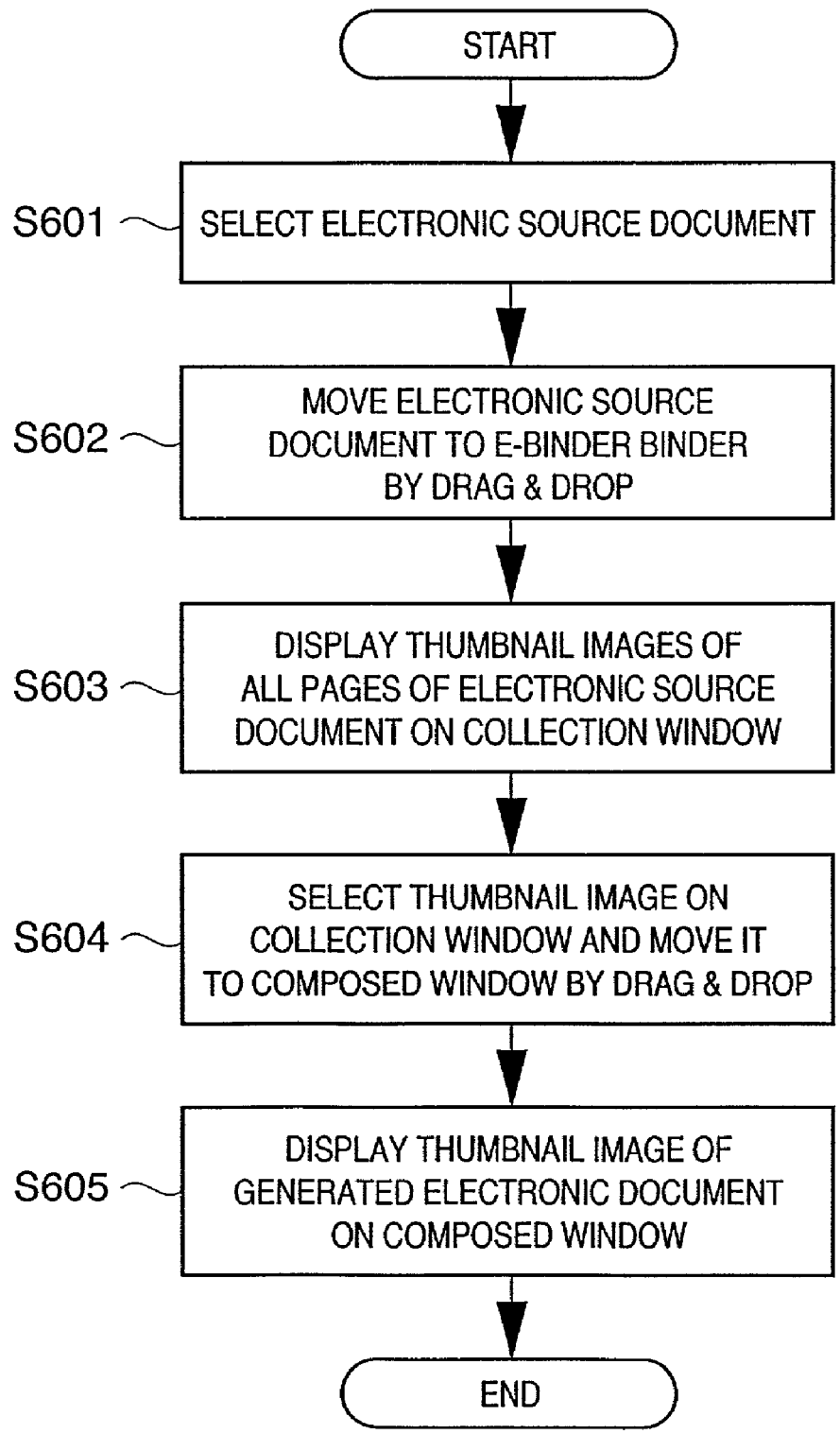
FIG. 6 is a flow chart showing generated electronic document creation processing of the embodiment.

FIG. 6 is a flow chart showing generated electronic document creation processing of the embodiment.

First, in step S601, an electronic source document is selected from the file management window 502. In step S602, the selected electronic source document is moved to the software window 503 of the electronic binder builder 102 by drag & drop. In this operation, the file is moved using a mouse as indicated by an arrow in FIG. 5. In step S603, thumbnail images are created from the moved file and displayed on the collection window 504. In this operation, the creation software for the electronic source document opens the document, executes pseudo printing operation, and creates files (electronic source document pages) with which the respective pages of the document can be processed. For example, when software ImageDriver is used, page images can be created. Thumbnail images can also be simultaneously created. In step S603, the created thumbnail images are displayed. In actually creating a file, the link destination (address) of an electronic source document is described by href= in <EFILE href=". . . > between <MATERIAL> and </MATERIAL> shown in FIG. 2B, and each thumbnail image is held by thumbnail= in <EPAGE page="1" thumbnail=". . . ¥thumb1.bmp"/>. The same operation is also executed to move a plurality of electronic source document pages.

In step S604, thumbnail images on the collection windows 504 are selected and moved to the composed window 505 by drag & drop. In this operation, the thumbnail images of electronic source document pages which are necessary for a final generated electronic document are selected from the collection windows 504 and moved to the composed window 505 where the generated electronic document is composed, thereby preparing the pages.

In step S605, the thumbnail images of the generated electronic document are displayed on the composed window 505. In this operation, the thumbnail images moved in step S604 are displayed at designated positions where the images have been dropped.

When this processing is ended, a generated electronic document composed of necessary pages of electronic source documents can be composed.

A detailed example in which the thumbnail image of a necessary electronic source document page is selected from the collection window 504 and moved to the composed window 505 where a generated electronic document is composed will be described next with reference to FIG. 7.

Figure 7:
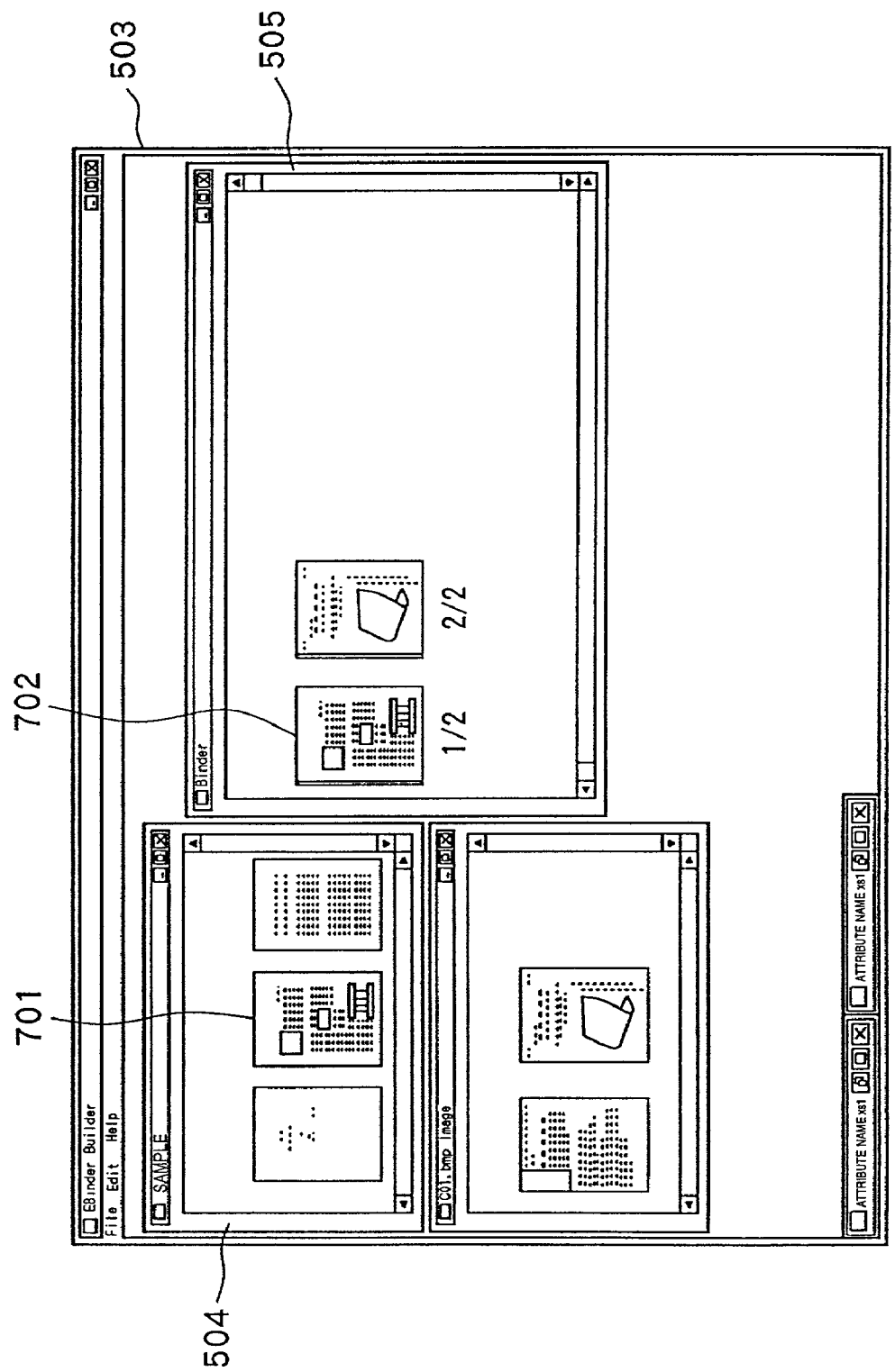
FIG. 7 is a view showing an operation example of the electronic binder builder of the embodiment.

Referring to FIG. 7, reference numeral 701 denotes each electronic source document page selected from the corresponding electronic source document on the collection window 504; and 702, a state wherein the electronic source document pages 701 are moved to the pages of the generated electronic document on the composed window 505.

This state will be described with reference to FIG. 2B. A description shown in FIG. 2B

```
<EFILE...>
  <EPAGES>
    <EPAGE page="1"
thumbnail="Material¥ef0000¥thum1.bmp"/>
    ......
  </EPAGES>
</EFILE>
......
<PAGEINDEX>
  <INDEX page="1" idref="ef0002" efilepage="3"/>
  <INDEX page="2" idref="ef0001" efilepage="2"/>
  <INDEX page="3" idref="ef0002" efilepage="2"/>
</PAGEINDEX>
``` includes between <EPAGE . . . > and </EPAGE> descriptions representing that thumbnail images are held. This indicates thumbnail images displayed on the collection window 504. The portion between <PAGEINDEX> and </PAGEINDEX> contains the page information of the thumbnail images displayed on the composed window 505. Instead of holding the entities of the thumbnail images, file names and pages in electronic source documents are indicated. For example, <INDEX page="1" idref="ef0002" efilepage="3" /> means that the id of an electronic source document is designated, and the third page of the file is used as the first page of the generated electronic document.

As described above, the electronic binder builder 102 can select necessary electronic source document pages from electronic source documents with different formats and re-edit them. Especially, as a characteristic feature in composing a generated electronic document, an original electronic source document used to generate a page can be found by link and operation can be performed for each electronic source document page.

A detailed example in which an electronic source document saved on the collection window 504 is moved to the composed window 505 will be described next with reference to FIG. 8.

Figure 8:
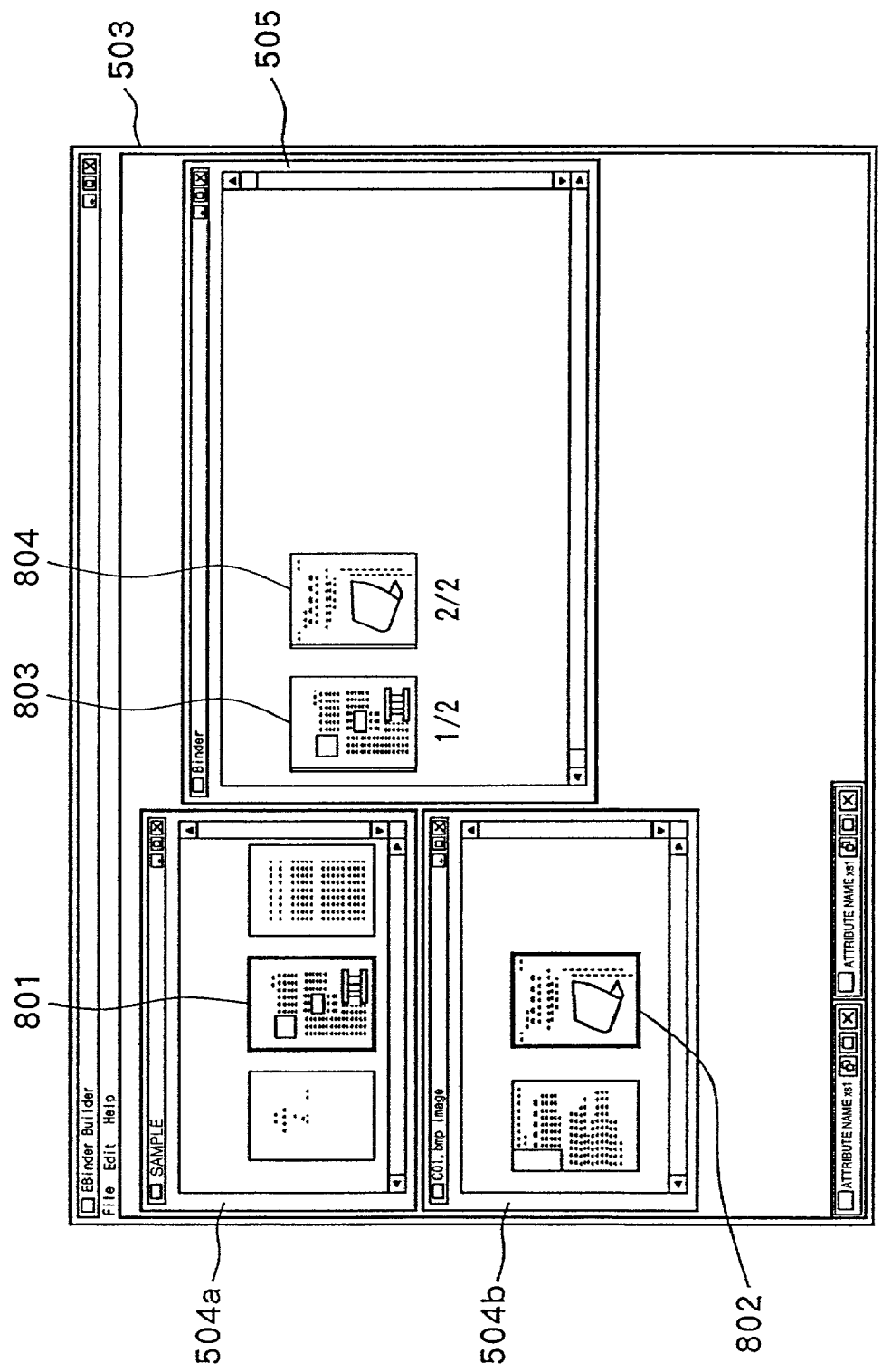
FIG. 8 is a view showing another operation example of the electronic binder builder of the embodiment.

FIG. 8 shows a state wherein two electronic source documents are input to the software window 503 of the electronic binder builder 102 and respectively held on collection windows 504*a* and 504*b*.

Reference numeral 801 denotes a selected thumbnail image of a page of electronic source document 1; and 802, a selected thumbnail image of a page of electronic source document 2. When these thumbnail images are moved to the composed window 505, the thumbnail images are displayed in the order of selection. In this case, as the thumbnail images 801 and 802 are selected in this order, thumbnail images 803 and 804 are displayed on the composed window 505.

FIG. 9 shows a detailed example in which when a thumbnail image 901 of another page of the electronic source document on the collection window 504 is moved by drag & drop to a position between the two thumbnail images displayed on the composed window 505, the thumbnail image 901 is inserted between the two thumbnail images as a thumbnail image 902. With this operation, the total number of pages is incremented by one.

FIGS. 10A to 10C show detailed examples which indicate that the pages of the generated electronic document generated by moving thumbnail images on the collection window 504 to the composed window 505 are laid out in the order of selection of electronic source document pages.

FIG. 10A shows a state wherein thumbnail images 1002 and 1001 on the collection window 504*a* are selected in the selection order shown in FIG. 10A. When the thumbnail images 1002 and 1001 are moved to the composed window 505 in the selection order shown in FIG. 10A, the thumbnail images are laid out on the composed window 505 in that selection order.

FIG. 10B shows a state wherein thumbnail images 1003 and 1004 on the collection window 504*a* are simultaneously selected. When the thumbnail images 1003 and 1004 are moved to the composed window 505, the thumbnail images are laid out in the order of pages of the electronic source document.

FIG. 10C shows a state wherein thumbnail images are selected from a plurality of electronic source documents, i.e., a thumbnail image 1005 on the collection window 504*a* and a thumbnail image 1006 on the collection window 504*b* are selected in the selection order shown in FIG. 10C. When the thumbnail images 1005 and 1006 shown in FIG. 10C are moved to the composed window 505, the thumbnail images are laid out on the composed window 505 in that selection order. Batch selection of thumbnail images from a plurality of electronic source documents is inhibited, or a priority order is set for electronic source documents such that thumbnail images are laid out on the composed window 505 in accordance with the priority order.

Figure 11:
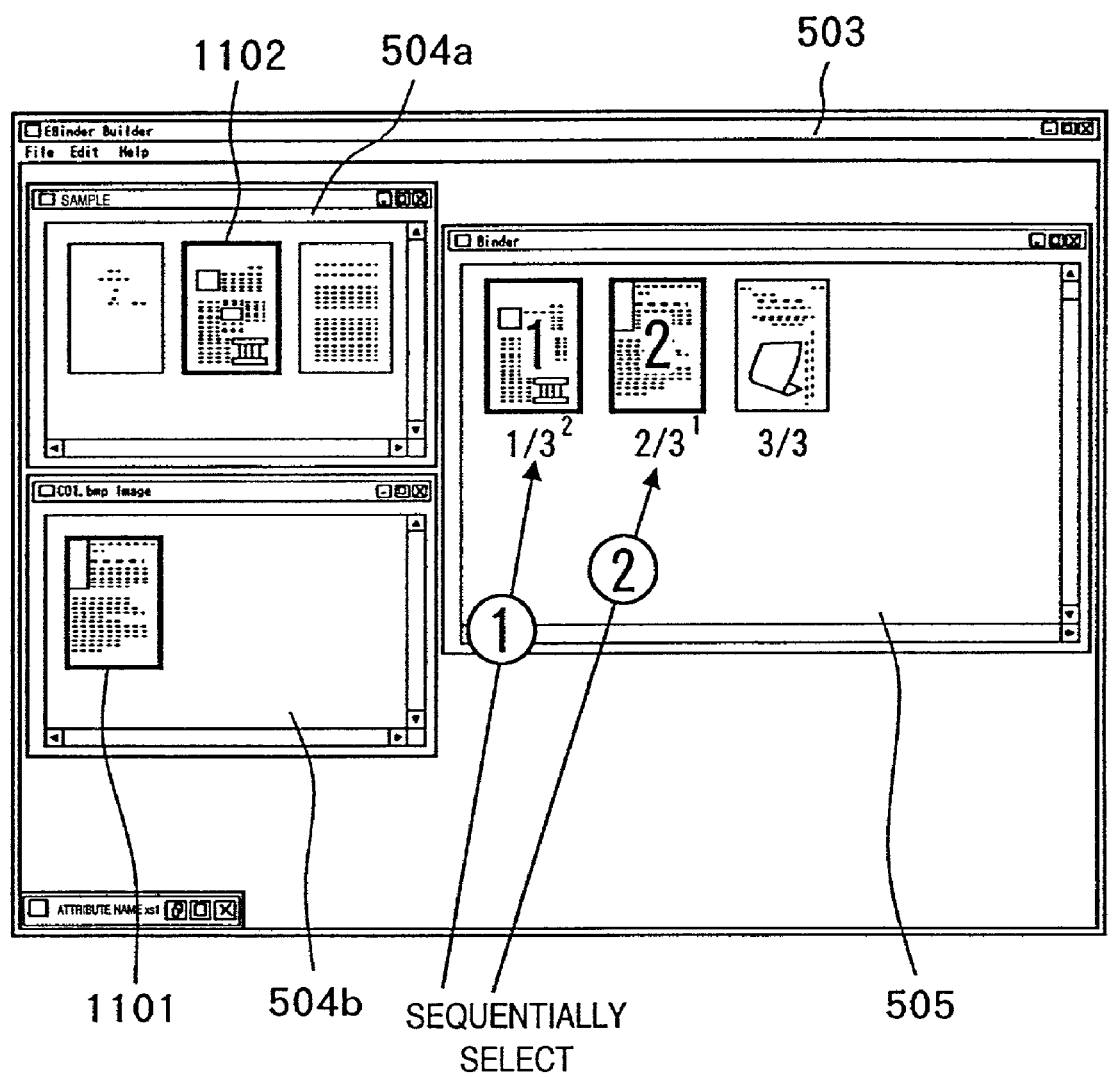
FIG. 11 is a view showing still another operation example of the electronic binder builder of the embodiment.

FIG. 11 shows a detailed example in which an original electronic source document from which a thumbnail image has been moved to the composed window 505 is indicated. When the thumbnail images of ⅓ and ⅔ pages on the composed window 505 are selected, a thumbnail image 1101 on the collection window 504*a* and a thumbnail image 1102 on the collection window 504*b*, which correspond to the thumbnail images on the composed window 505, are displayed as frames or semitransparent images, thereby indicating that the thumbnail images are being selected.

Since the identification number and page number of electronic source document are described in <INDEX page="1" idref="ef0002" efilepage="3"/> in <PAGEINDEX>, each page of the electronic source document can be traced.

FIG. 12 shows a detailed example in which the pages of thumbnail images saved on the composed window 505 are replaced. In this example, a thumbnail image 1201 of ⅔ page is moved next to the thumbnail image on the right side by drag & drop, the thumbnail image 1201 replaces the adjacent thumbnail image and is displayed as a thumbnail image 1202. With this operation, a description

```
<PAGEINDEX>
  <INDEX page="1" idref="ef0001" efilepage="3"/>
  <INDEX page="2" idref="ef0001" efilepage="2"/>
  <INDEX page="3" idref="ef0002" efilepage="2"/>
  <INDEX page="4" idref="ef0001" efilepage="4"/>
</PAGEINDEX>
changes to
<PAGEINDEX>
  <INDEX page="1" idref="ef0001" efilepage="3"/>
  <INDEXpage="2"idref="ef0002"efilepage="2"/>
  <INDEXpage="3"idref="ef0001"efilepage="2"/>
  <INDEX page="4" idref="ef0001" efilepage="4"/>
</PAGEINDEX>
```

The description is edited as indicated by the underlines.

Figure 13:
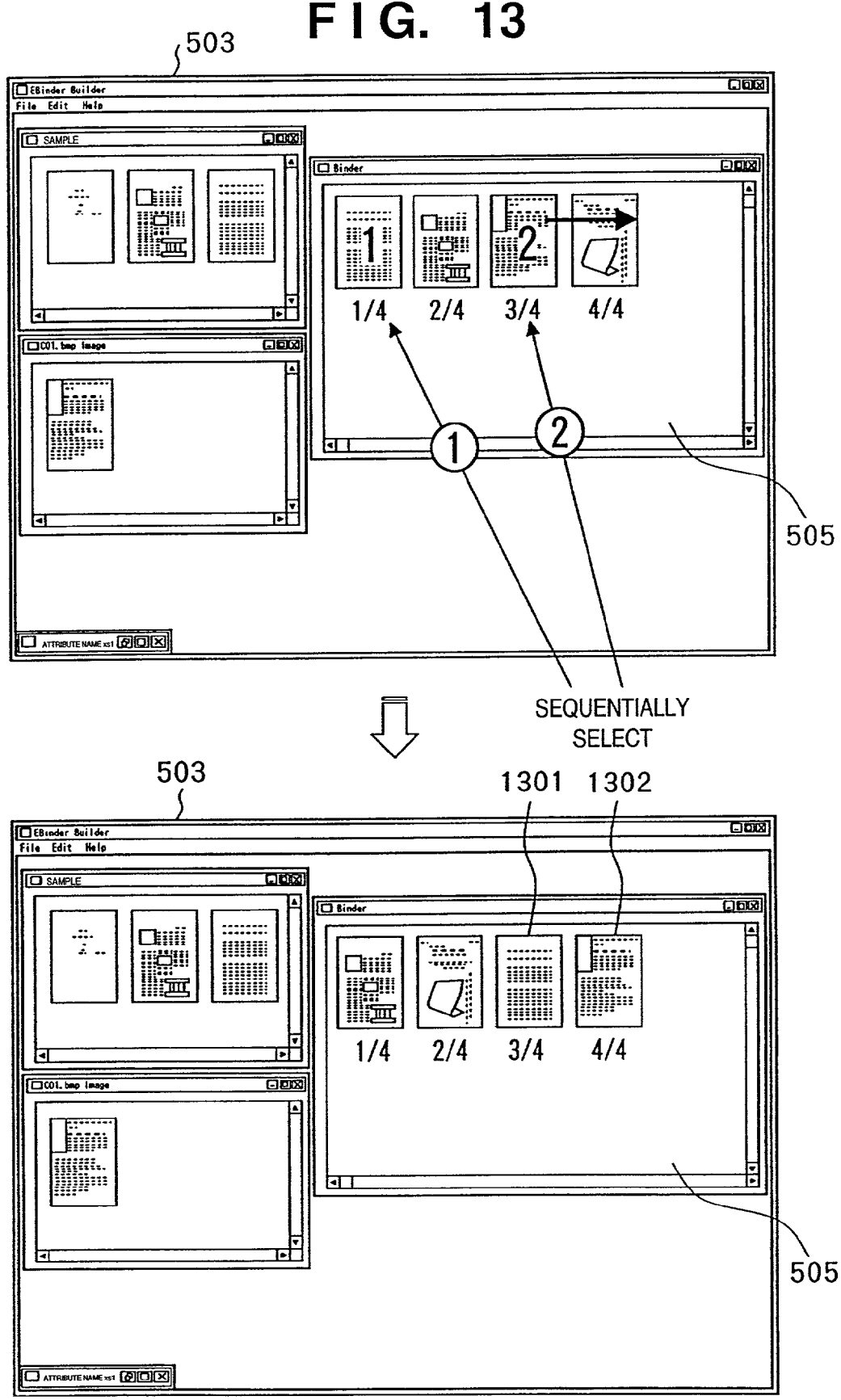
FIG. 13 is a view showing still another operation example of the electronic binder builder of the embodiment.

FIG. 13 shows a detailed example in which a plurality of thumbnail images saved on the composed window 505 are separately selected to replace their pages. The numbers are stored in the selection order, and thumbnail images are directly moved to the designated positions. Reference numerals 1301 and 1302 denote results of movement of selected thumbnail images. In this movement, since the thumbnail images are replaced in the selection order, a forward order is shown in FIG. 13. However, when a thumbnail image with a larger page number is selected first, the page layout is reversed after replacement. In the example shown in FIG. 13, if the selection order is reversed to 2 and 1, the layout order of the thumbnail images 1301 and 1302 is reversed.

The page of a thumbnail image saved on the composed window 505 can also be copied. As in page replacement, a thumbnail image on the composed window 505 is selected. The user instructs "copy" and then "paste" at an arbitrary position on the composed window 505, thereby copying the selected thumbnail image to that position.

When the third page is inserted between the first and second pages of a generated electronic document having three pages, a description

```
<PAGE INDEX>
  <INDEX page="1" idref="ef0002" efilepage="3"/>
  <INDEX page="2" idref="ef0001" efilepage="2"/>
  <INDEX page="3" idref="ef0002" efilepage="2"/>
</PAGEINDEX>
changes to
<PAGEINDEX>
  <INDEX page="1" idref="ef0002" efilepage="3"/>
  <INDEXpage="2"idref="ef0002"efilepage="2"/>
  <INDEX page="3" idref="ef0001" efilepage="2"/>
  <INDEX page="4" idref="ef0002" efilepage="2"/>
</PAGEINDEX>
```

The description is edited as indicated by the underline.

The page of a thumbnail image saved on the composed window 505 can also be deleted. As in page replacement, the user selects a thumbnail image on the composed window 505 and then instructs "delete", thereby deleting the selected thumbnail image.

When the third page of a generated electronic document having three pages is deleted, a description

```
<PAGEINDEX>
  <INDEX page="1" idref="ef0002" efilepage="3"/>
  <INDEX page="2" idref="ef0001" efilepage="2"/>
  <INDEX page="3" idref="ef0002" efilepage="2"/>
</PAGEINDEX>
changes to
<PAGEINDEX>
  <INDEX page="1" idref="ef0002" efilepage="3"/>
  <INDEX page="2" idref="ef0002" efilepage="2"/>
</PAGEINDEX>
```

Figure 14:
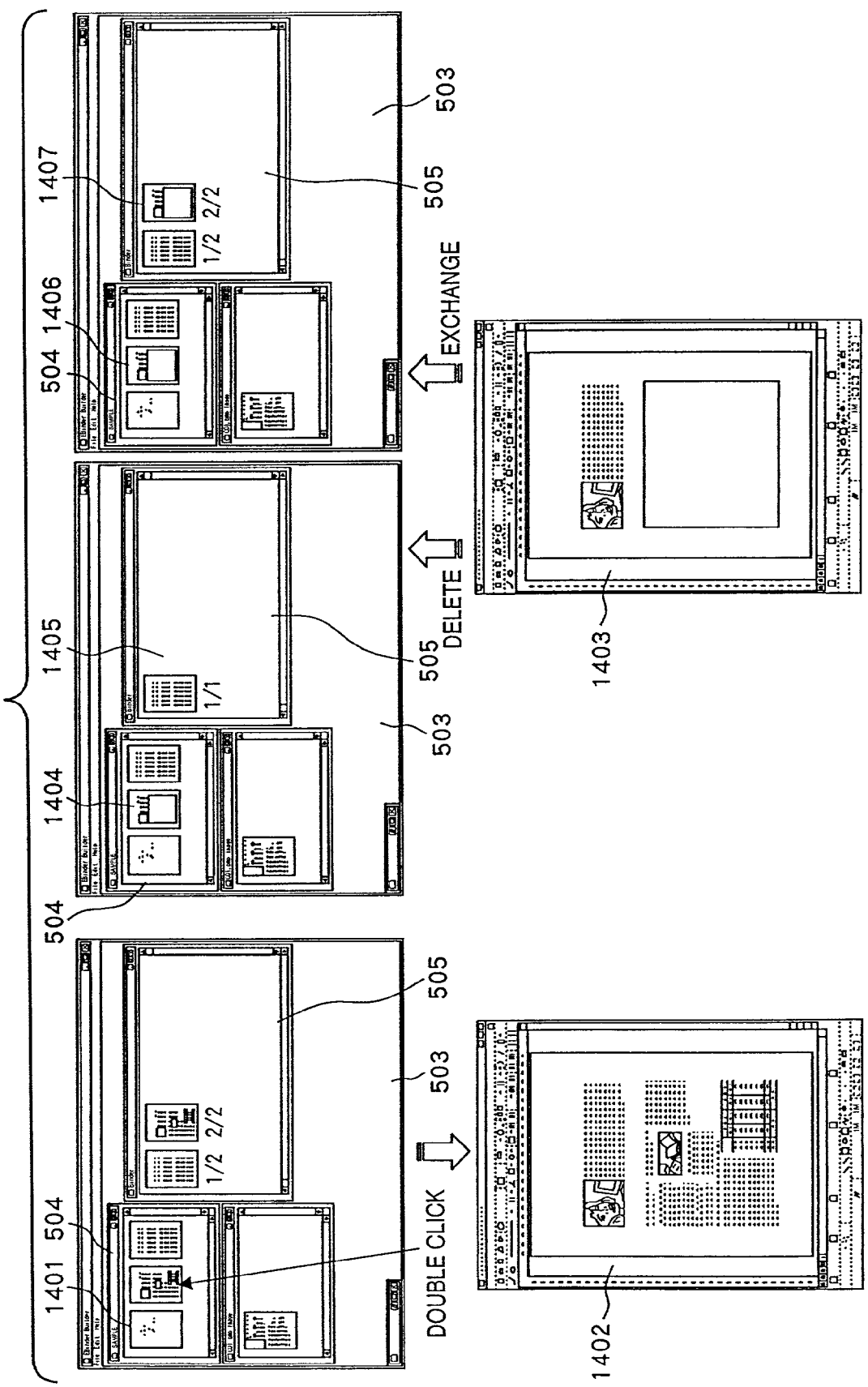
FIG. 14 is a view showing still another operation example of the electronic binder builder of the embodiment.
Figure 15:
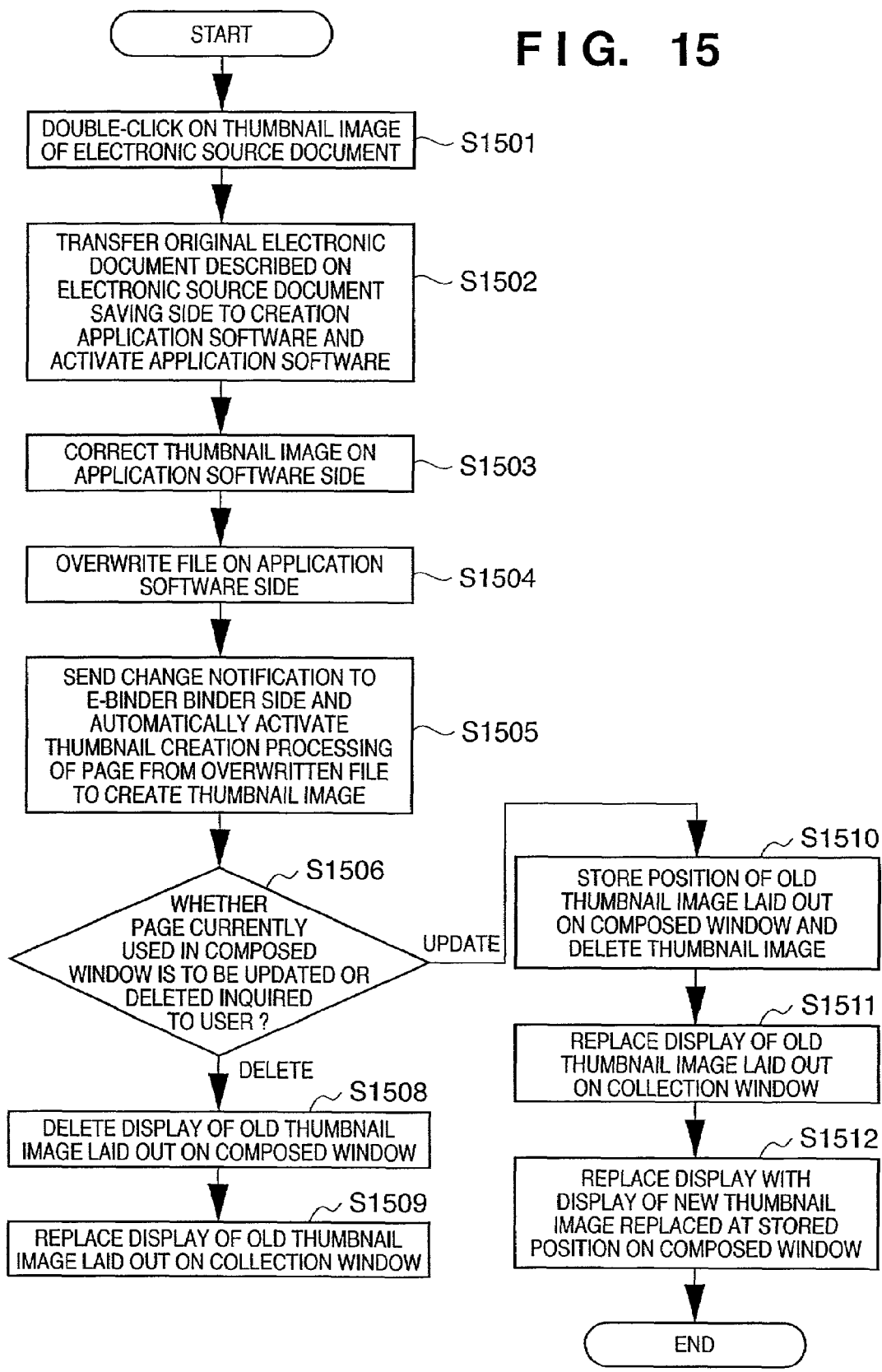
FIG. 15 is a flow chart showing generated electronic document edit processing of the embodiment.

FIG. 14 shows a detailed example in which an electronic source document which has already been used is re-edited and reused. This detailed example will be described also using the flow chart shown in FIG. 15.

In step S1501, a thumbnail image 1401 of an electronic source document page on the collection window 504 is double-clicked. As a result, in step S1502, application software which has created the electronic source document receives the electronic source document containing an electronic source document page 1402 and is activated.

In step S1503, the electronic source document page is corrected on the application software side. After correction, an electronic source document 1403 corrected on the application software side is overwritten and saved in step S1504. As a result of this saving, the electronic binder builder 102 receives a change notification and promotes the user to input an instruction. In step S1505, thumbnail creation processing for creating the thumbnail image of the updated electronic source document page is activated.

In step S1506, the user is inquired about whether the electronic source document page that is currently being used on the composed window 505 is to be updated or deleted. This is because when the electronic source document page is updated, the contents of the page of the electronic source document change, and those on the generated electronic document side must also be changed.

When a delete instruction is input, an old thumbnail image 1405 laid out on the composed window 505 is deleted in step S1508. In step S1509, the display of the old thumbnail image 1401 laid out on the collection window 504 is replaced with a new thumbnail image 1404. Thus, delete processing is ended.

When not a delete instruction but an update instruction is input, in step S1510, the position of the old thumbnail image laid out on the composed window 505 is stored, and the old thumbnail image is deleted. In step S1511, the display of the old thumbnail image 1401 on the collection window 504 is replaced with a new thumbnail image 1406. In step S1512, a new thumbnail image 1407 is displayed at the stored position on the composed window 505.

FIG. 16 shows a detailed example in which a thumbnail image saved on the composed window 505 is rotated.

Referring to FIG. 16, two thumbnail images indicated by 1601 are selected. Assume that an instruction of 90° clockwise rotation is input. In this case, although the page direction (portrait) is kept unchanged, the displayed contents are rotated through 90° with respect to the page direction, as indicated by 1602. An instruction of 90° counterclockwise rotation can also be input.

FIG. 17 shows another detailed example in which a thumbnail image saved on the composed window 505 is rotated.

Referring to FIG. 17, two thumbnail images denoted by 1701 are selected. When an instruction of 180° rotation is input, the selected thumbnail images are rotated through 180°, i.e., upside down, as indicated by 1702.

Figure 18:
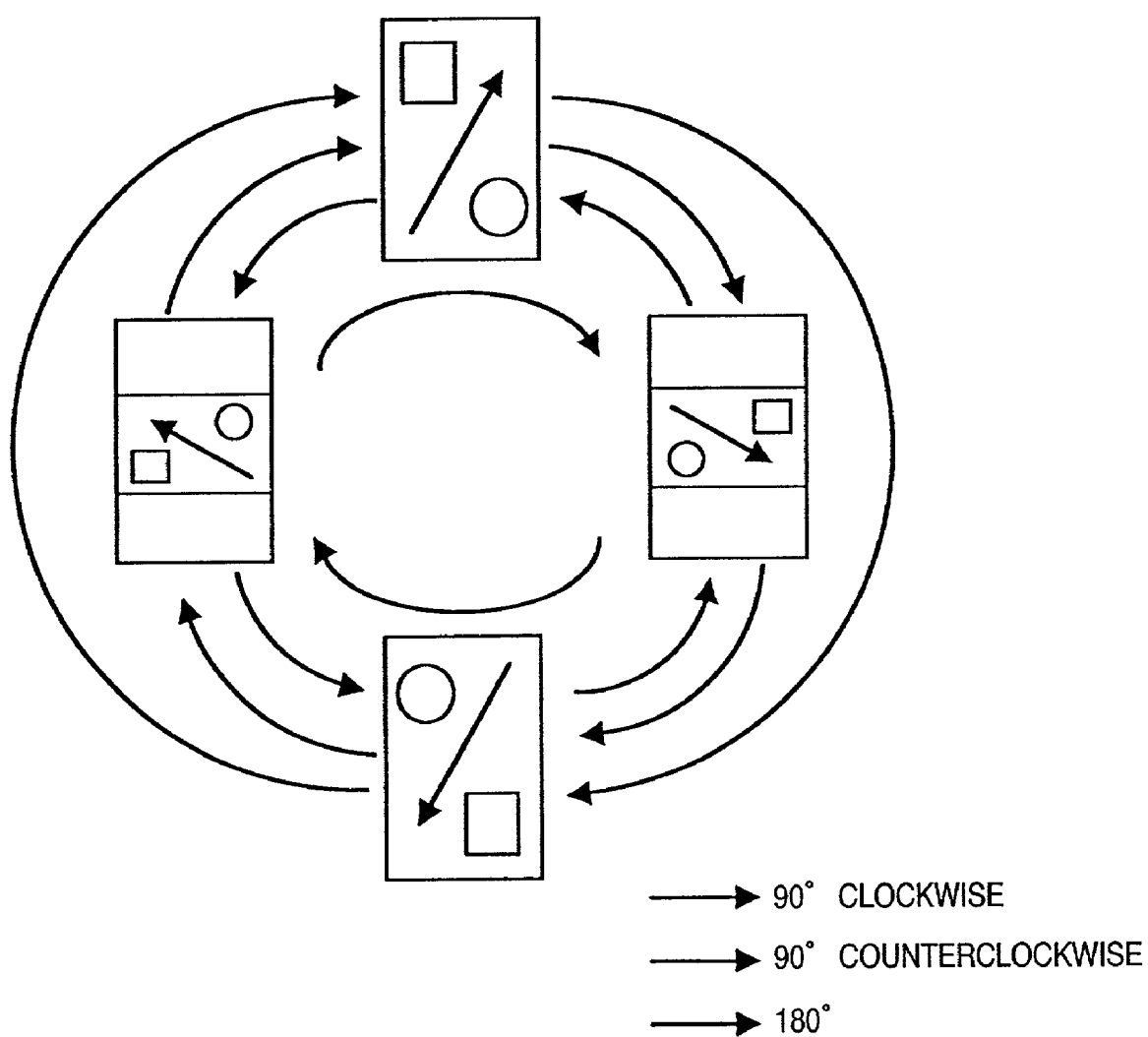
FIG. 18 is a view showing the correlation in rotation of a thumbnail image.

FIG. 18 is a view showing the correlation in rotation of a thumbnail image in this embodiment.

A case wherein the first and second pages of a generated electronic document having three pages are rotated through 90° clockwise will be described below.

A description

```
<PAGEINDEX>
  <INDEX page="1" idref="ef0002" efilepage="3"/>
  <INDEX page="2" idref="ef0001" efilepage="2"/>
  <INDEX page="3" idref="ef0002" efilepage="2"/>
</PAGEINDEX>
changes to
<PAGEINDEX>
  <INDEX page="1" idref="ef0002" efilepage="3" rotate="90"/>
  <INDEX page="2" idref="ef0001" efilepage="2" rotate="90"/>
  <INDEX page="3" idref="ef0002" efilepage="2"/>
</PAGEINDEX>
```

The description is edited as indicated by the underlines. In this case, rotate= indicates rotation of the page. In this embodiment, the unit of rotation is degree, and clockwise rotation is described by a positive value. The unit may be radian, and counterclockwise rotation may be described by a positive value. If a page is not rotated, like the third page of the above generated electronic document, rotate= is omitted, or rotate="0" is described.

Some formats are used to finally store a generated electronic document by rotation.

(1) A format for storing all pieces of information containing the electronic source documents and the generated electronic document (2) A format for storing only the generated electronic document (3) A format for storing only the electronic source documents The above formats will be sequentially described.

(1) Format for Storing All Pieces of Information Containing Electronic Source Documents and Generated Electronic Document This is a description format described with reference to FIGS. 2A and 2B with which the information of each electronic source document can be found from the generated electronic document. This state can be represented as follows by a part selected from an XML description.

```
<EBINDER>
  <MATERIAL files="2">
    <EFILE ...>
      <EPAGES>
        <EPAGE page="1"
thumbnail="Material¥ef0000¥thumb1.bmp"
pagefile="office¥ppt0000¥page1.tiff" type=TIFF>
        ......
```

-continued

```
<EPAGES>
<EFILE ...> ......
</EFILE>
</MATERIAL>
<PAGEINDEX>
    <INDEXpage="1" idref="efile0002" efilepage="3"/>
    <INDEXpage="2" idref="efile0001" efilepage="2"/>
    <INDEXpage="3" idref="efile0002" efilepage="2"/>
</PAGEINDEX>
</EBINDER>
```

In this state, the thumbnail images of the respective pages of electronic source documents and document pages used in the generated electronic document are held using an image file format (TIFF) in this example (an intermediate format capable of describing each page, such as PDF or XML/SVG, may be used). Since the pages are designated on the generated electronic document side, all information documents capable of reconstructing the pages are held. Conversely, electronic source document pages on the electronic source document side, which are not designated on the generated electronic document side, need not always be held because the file size becomes large. In this way, the generated electronic document is stored as a set of a plurality of electronic documents on the electronic source document side and on the generated electronic document side.

(2) Format for Storing Only Generated Electronic Document

This storing method is used when only the generated electronic document is necessary.

Figure 3B:
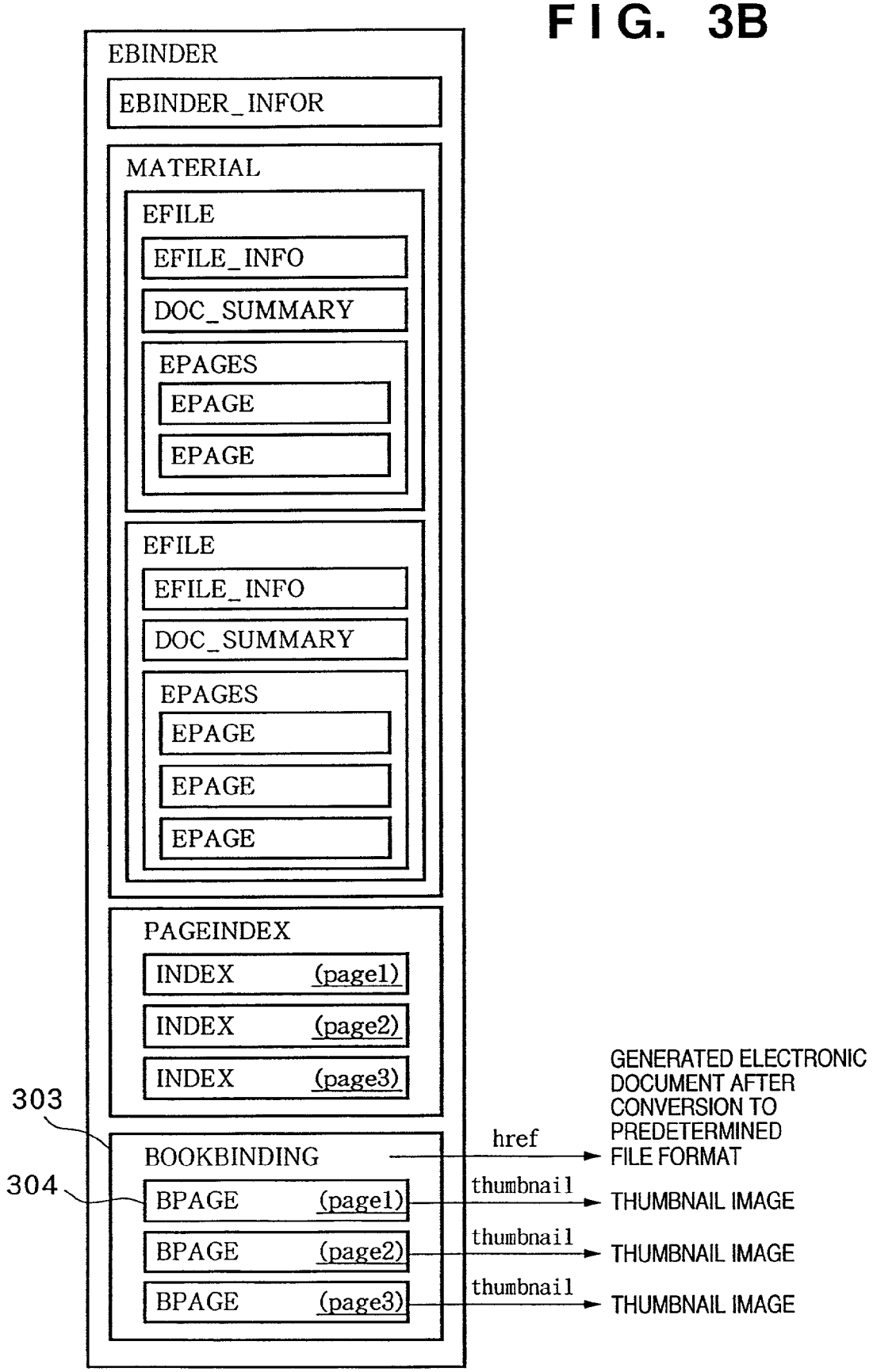
FIG. 3B is a view showing the format block structure of still another generated electronic document composed by the electronic binder builder of the embodiment.

In the document with the format (1), the electronic source documents and generated electronic document are integrated. When pieces of information of electronic source document pages are collected to a Bookbinding portion (303) shown in FIG. 3B, the electronic source document pages are completely extracted from the electronic source documents and held. This state can be represented as follows by a part selected from an XML description.

```
<EBINDER>
<MATERIAL files="2">
    <EFILE...>
    <EPAGES> ......
    <EPAGES>
    </EFILE>
    <EFILE>
    </EFILE>
</MATERIAL>
<PAGEINDEX>
    <INDEX page="1" idref="ef0002" efilepage="3"/>
    <INDEX page="2" idref="ef0001" efilepage="2"/>
    <INDEX page="3" idref="ef0002" efilepage="2"/>
</PAGEINDEX>
<BOOKBINDING href="bind¥bind.tiff type="tiff">
    <EPAGE page="1" thumbnail="bind¥page1.png"/>
    <BPAGE page="2" thumbnail="bind¥page2.png"/>
    <BPAGE page="3" thumbnail="bind¥page3.png"/>
</BOOKBINDING>
</EBINDER>
```

In this format, the portion between <BOOKBINDING href="bind¥bind.tiff type="tiff"> and </BOOKBINDING> is added, and in this state, the generated electronic document composed of electronic source document pages is stored in one file format. In the example, the generated electronic document is stored as a file bind.tiff in which images of a plurality of pages are bound (bind.pdf or bind.xml may also be used). The thumbnail images of the respective pages are described by <BPAGE page="1" thumbnail="bind¥page1.png"/> and the like. This means that thumbnail images used in electronic source documents are copied and subordinated to the generated electronic document. A complete state on the generated electronic document side means a state wherein all the thumbnail images are complete. At this time, information sandwiched between <MATERIAL> and </MATERIAL> or between <EFILES> and </EFILES> can be omitted.

Hence, the above description can be simplified to

```
<EBINDER>
    <BOOKBINDING href="bind¥bind.tiff" type="tiff">
        <BPAGE page="1" thumbnail="bind¥page1.png"/>
        <BPAGE page="2" thumbnail="bind¥page2.png"/>
        <BPAGE page="3" thumbnail="bind¥page3.png"/>
    </BOOKBINDING>
</EBINDER>
```

More simply, only the bind.tiff file may be stored. This description is used when only a file binding page is to be simply acquired.

(3) Format for Storing Only Electronic Source Documents

This format stores only electronic source documents. An electronic source document temporarily moved to the electronic binder builder 102 side holds its original document and the thumbnail images of the respective pages. This state can be represented as follows by a part selected from an XML description.

```
<EBINDER>
    <EBINDER_INFO> ......
    </EBINDER_INFO>
    <MATERIAL files="2>
        <EFILE href="office¥ppt0000¥F_c01.ppt"
composedpagefile="pimg¥efile0001.pdf" type="pdf"
totalpage="2" id="ef0001">
            <EFILE_INFO datatype="PowerPoint2000"> ......
            </EFILE_INFO>
            <EPAGES>
                <EPAGE page="1"
thumbnail="Material¥ef0000¥thumb1.bmp"/>
                <EPAGE page="2" thumbnail="Material
¥ef0000¥thumb2.bmp"/>
            </EPAGES>
        </EFILE>
        <EFILE href="office¥word0000¥28J_App1HTML.doc"
composedpaqefile="pimg¥efile0002.pdf" type="pdf"
totalpage="3" id="ef0002">
            <EFILE_INFO datatype="PowerPoint2000"> ......
            </EFILE_INFO>
        </EFILE>
    </MATERIAL>
</EBINDER>
```

In this example, only the electronic source documents are stored, and the generated electronic document is not stored. This format is often used to temporarily stop building a generated electronic document and store it. Alternatively, when an original electronic document is changed by the electronic binder builder 102 or when only the original electronic document of corrected version is necessary, only the electronic document described by href="office¥ppt0000¥F_c01.ppt" is extracted and stored.

Figure 19:
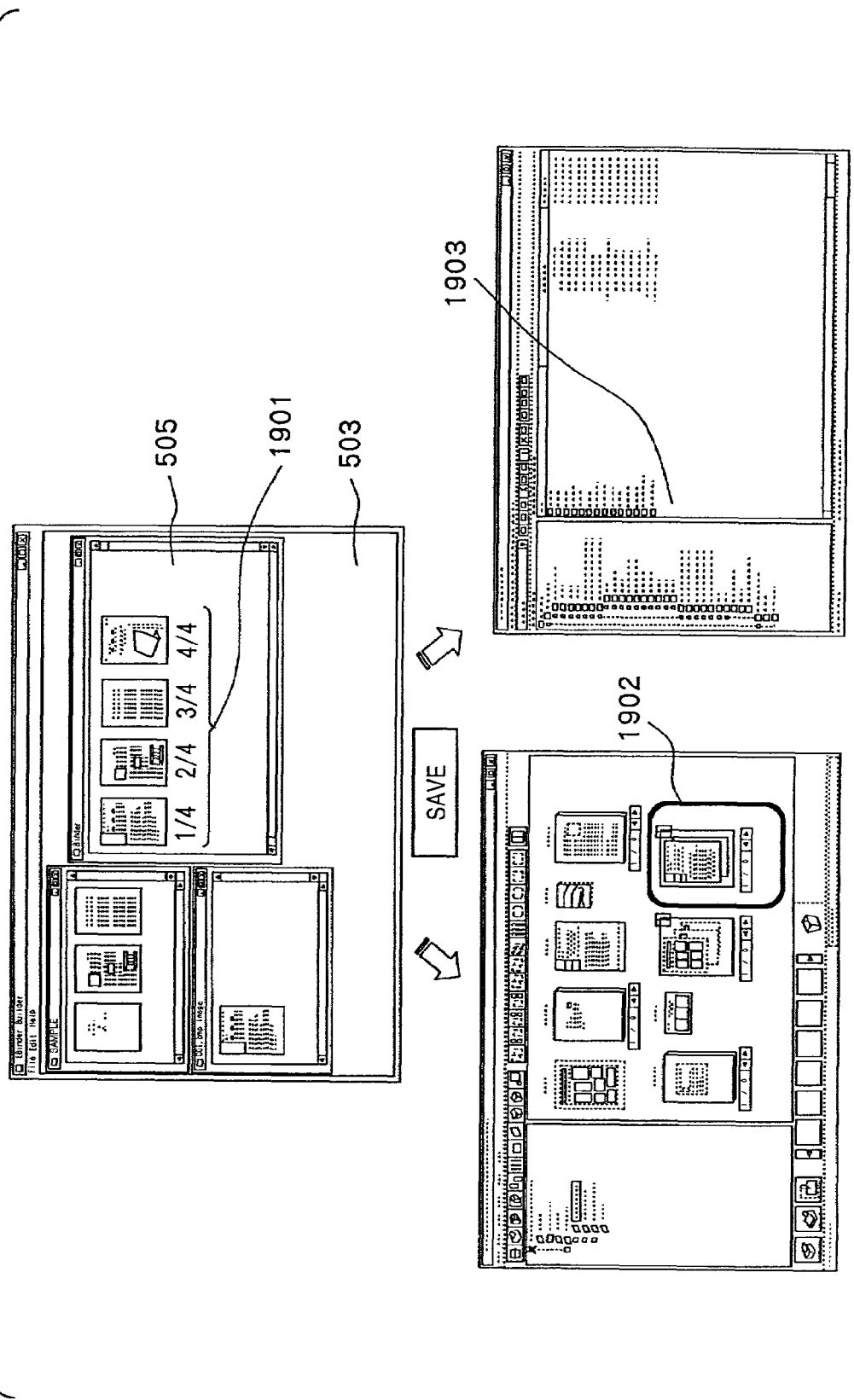
FIG. 19 is a view showing still another operation example of the electronic binder builder of the embodiment.

The three formats have been described above. FIG. 19 shows a detailed example, and this will be described below.

Referring to FIG. 19, reference numeral 1901 denotes a state wherein a generated electronic document is created on the composed window 505. In the document management system, when this state is directly stored, a binder mark is added to the upper right corner, as indicated by 1902, to represent a form of a composite document. On the document management system side, the thumbnail image of the generated electronic document is displayed, and the user is notified of the presence of electronic source documents by the binder mark. When the generated electronic document is stored in a file management window 1903 on a normal OS, the generated electronic document is stored as a structure with a plurality of files and a plurality of folders, as shown in FIG. 4. To confirm the generated electronic document on the normal OS, a method of confirming two files, E-Binder.xml and style sheet E-Binder.xsl, using a browser is generally used. The bound generated electronic document in the Bookbinding folder may be directly browsed. In either case, linked files can be obtained.

As described above, according to this embodiment, one integrated electronic document (generated electronic document) is created from a plurality of different electronic documents (electronic source documents), and the documents are closely bound. That is, a document structure in which the relationship between the electronic source documents and the generated electronic document is provided. As a result, when an electronic source document is changed, the generated electronic document can also be changed.

Another Embodiment 1

Figure 20A:
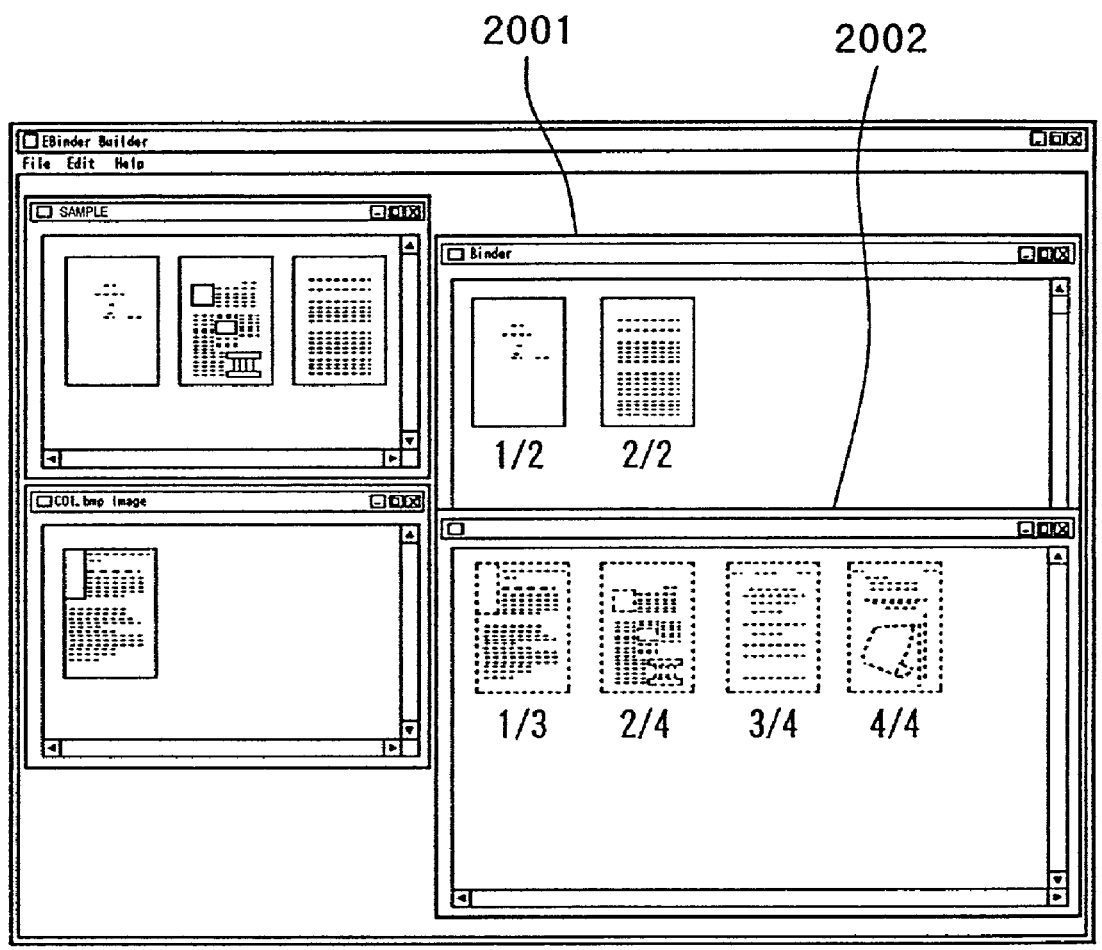
FIG. 20A is a view showing an operation example of an electronic binder builder according to Another Embodiment 1.
Figure 20B:
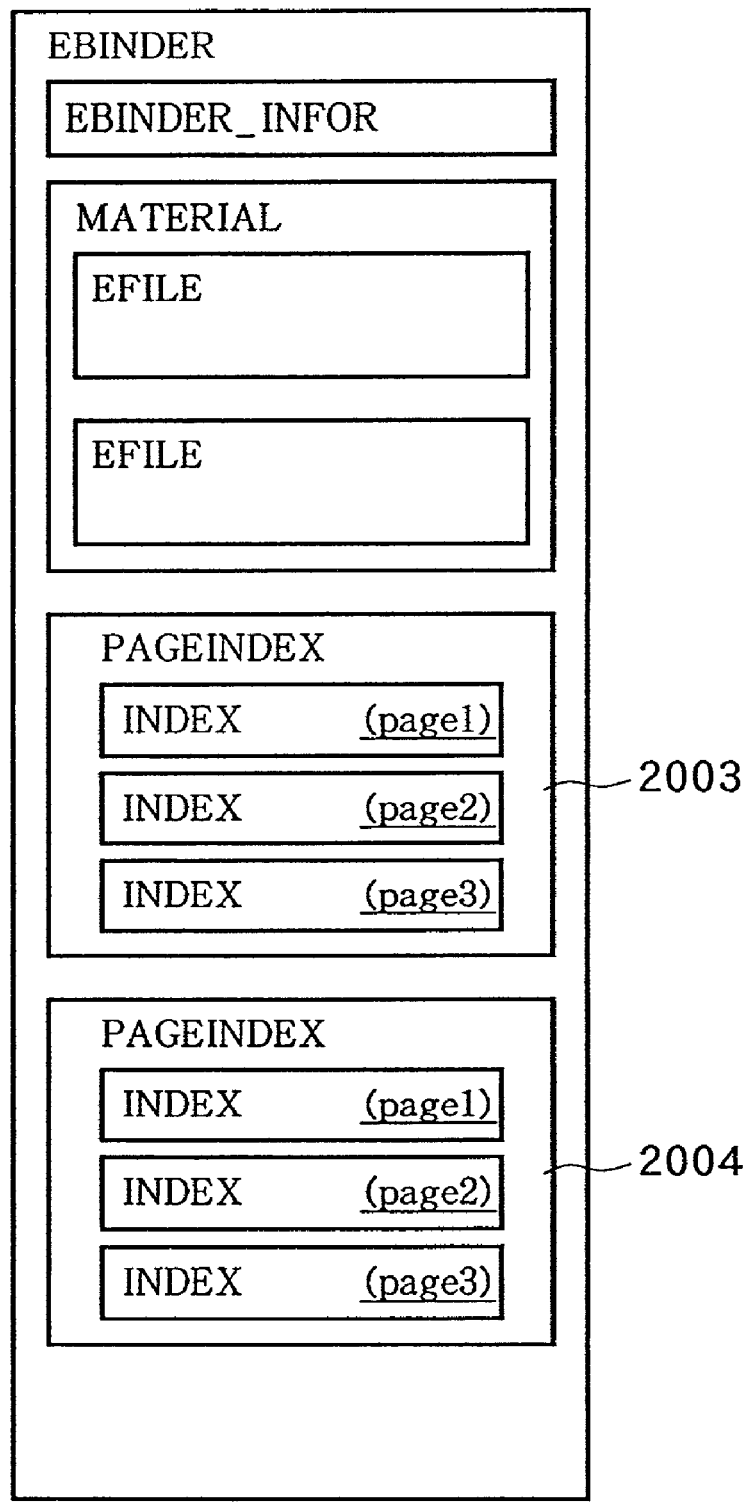
FIG. 20B is a view showing the format block structure of a generated electronic document composed by the electronic binder builder of Another Embodiment 1.

FIGS. 20A and 20B show a structure with a plurality of generated electronic documents. Especially, FIG. 20A shows a detailed example. Reference numerals 2001 and 2002 denote composed windows for operating generated electronic documents. FIG. 20B is a view showing the format block structure of generated electronic documents corresponding to FIG. 20A. In this embodiment, a plurality of PageIndex portions are prepared. With this structure, the plurality of composed windows 2001 and 2002 are laid out, as shown in FIG. 20A, and a plurality of generated electronic documents can be created. Reference numerals 2003 and 2004 in FIG. 20B denote structures in which a plurality of generated electronic documents are held. For example, confidential and unconfidential documents can be separated by changing the cover.

As described above, according to Another Embodiment 1, since a plurality of generated electronic documents can be created, generated electronic documents with different compositions can be created from common electronic source documents. For example, generated electronic documents with slightly different contents can be created for the respective distribution destinations.

Another Embodiment 2

In Another Embodiment 2, processing of adding an electronic source document page to a generated electronic document in creating the generated electronic document from a plurality of electronic source documents will be described with reference to FIG. 21.

FIG. 21 is a flow chart showing processing of adding an electronic source document page to a generated electronic document of Another Embodiment 2.

In step S1101, a thumbnail image to be added to a composed window 505 is selected from a collection window 504 and moved to a desired adding position on the composed window 505 by drag & drop.

It is determined in step S1102 whether a page (thumbnail image) is present before or after the desired adding position. The relative position used in this determination, "before" or "after", is preset. In this embodiment, it is determined in step S1102 whether a page is present before the desired adding position (the relative position is "before"). However, it may be determined whether a page is present after the desired adding position.

If a page is present before the desired adding position (YES in step S1102), the flow advances to step S1103.

If no page is present before the desired adding position (NO in step S1102), the flow advances to step S1106 to lay out the thumbnail image to the desired adding position on the composed window 505. In this case, the direction of the electronic source document page corresponding to the thumbnail image is not changed.

When the desired adding position is at the start of the integrated electronic document, no page is present before the desired adding position. However, when the desired adding position is at the start of the integrated electronic document, it is determined whether a page is present after the desired adding position.

Similarly, when the relative position used in the determination is "after", and the desired adding position is at the end, it is determined whether a page is present before the desired adding position.

With this processing, independently of whether the desired adding position is at the start or end of the integrated electronic document, determination in step S1102 is correctly executed.

In step S1103, the direction of the page before the desired thumbnail image adding position is checked, and it is determined whether the direction of that page is different from the direction of the electronic source document page corresponding to the thumbnail image to be added. If the direction of the thumbnail image to be added is same as that of the page before the desired adding position (NO in step S1103), the flow advances to step S1106 to lay out the thumbnail image to the desired adding position on the composed window 505. If the directions are different (YES in step S1103), the flow advances to step S1104.

In step S1104, rotation processing for the electronic source document page corresponding to the thumbnail image to be added is executed. With this rotation processing, for example, a landscape electronic source document page is rotated through 90° to obtain a portrait electronic source document page. With this processing, the thumbnail image is laid out in the same direction as that of the adjacent page before or after it.

In step S1105, enlargement/reduction processing (magnification processing) is executed for the rotated electronic source document page such that margins in that direction are minimized. That is, when the rotated image is a portrait image, enlargement/reduction processing (magnification processing) is executed such that the upper and lower margins are minimized. When the rotated image is a landscape image, enlargement/reduction processing (magnification processing) is executed such that the left and right margins are minimized. In the above way, an electronic source document page whose image size is made as large as possible with respect to the direction of the rotated electronic source document page is created.

In step S1106, a thumbnail image corresponding to the electronic source document page obtained by rotation processing and enlargement/reduction processing (magnification processing) is laid out to the desired adding position on the composed window 505.

As described above, according to Another Embodiment 2, in creating a new generated electronic document by binding a plurality of electronic source document pages in different directions, the directions are automatically aligned to make an appropriate format. Hence, a generated electronic document easy to read can be composed.

Figure 22:
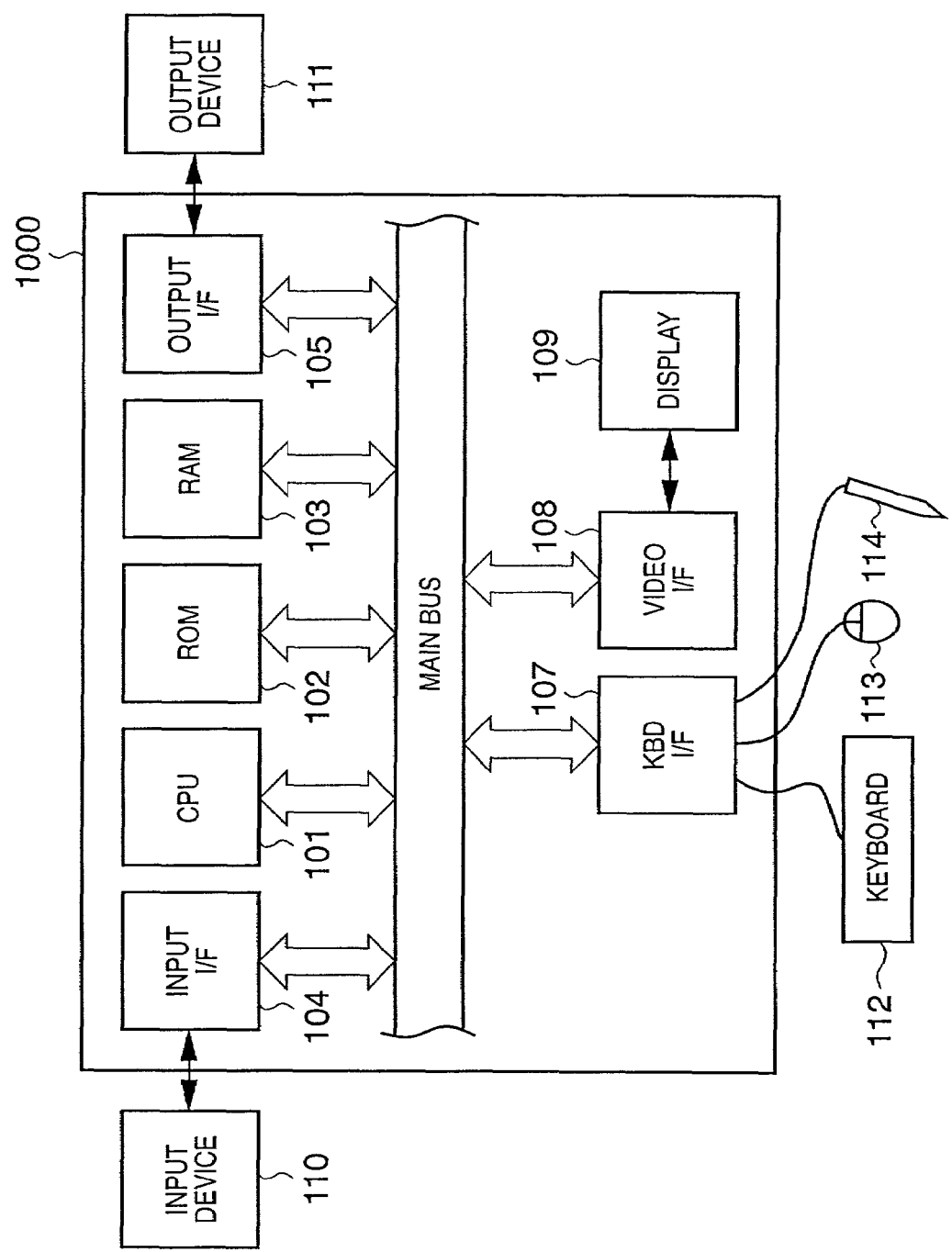
FIG. 22 is a block diagram showing the arrangement of an information processing apparatus applicable to the document management system of the present invention.

An information processing apparatus applicable to the above-described document management system of each embodiment of the present invention is shown in FIG. 22.

FIG. 22 is a block diagram showing the arrangement of the information processing apparatus applicable to the document management system of the present invention.

Referring to FIG. 22, a CPU 101 controls an entire information processing apparatus 1000 through a main bus 106 and also controls through an input I/F (interface) 104 an input device 110 (e.g., an image scanner, storage device, another information processing apparatus connected through a network line, or a facsimile apparatus connected through a telephone line) externally connected to the information processing apparatus 1000. The CPU 101 also controls through an output I/F (interface) 105 an output device 111 (e.g., a printer, monitor, another information processing apparatus connected through a network line, or a facsimile apparatus connected through a telephone line) externally connected to the information processing apparatus 1000. The CPU 101 executes a series of processing operations such as image input, image processing, color conversion processing, and image output control in accordance with an instruction input from an input section (e.g., a keyboard 112, pointing device 113, or pen 114) through a KBD I/F (keyboard interface) 107. The CPU 101 also controls through a video I/F (interface) 108 a display section 109 for displaying image data input from the input device 110 or image data created using the keyboard 112, pointing device 113, or pen 114.

A ROM 102 stores various control programs for executing various control operations of the CPU 101. An OS and control programs including a control program for implementing the present invention are loaded to a RAM 103 and executed by the CPU 101. The RAM 103 also functions as various work areas used to execute the control programs or temporary save area. In addition, a VRAM (not shown) for temporarily holding image data input from the input device 110 or image data created using the keyboard 112, pointing device 113, or pen 114 is constructed.

The present invention may be applied to either a system constituted by a plurality of devices (e.g., a host computer, an interface device, a reader, a printer, and the like) or an apparatus comprising a single device (e.g., a copying machine, a facsimile apparatus, or the like).

The object of the present invention is achieved even by supplying a storage medium which stores the program codes of software for implementing the functions of the above-described embodiments and causing the computer (or a CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium for supplying the program codes, for example, a floppy disk, hard disk, optical disk, magnetooptical disk, CD-ROM, CD-R, magnetic tape, nonvolatile memory card, ROM, or the like can be used.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, it stores program codes corresponding to the above-described flow charts.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus including a computer-readable memory storing a computer program which when executed composes an integrated electronic document, said apparatus comprising:

holding means for holding a plurality of kinds of electronic source documents, each of the electronic source documents including a plurality of source pages;

selection means for selecting at least one desired source page from the plurality of source pages included in the plurality kinds of electronic source documents held by said holding means;

composition means for composing the integrated electronic document on the basis of at least one source page selected by said selection means, wherein the integrated electronic document is composed of link information that links to the selected source page, the selected source page being used as a page of the integrated electronic document;

editing means for controlling to edit and then overwrite with an edited source page, the source page in the electronic source document, wherein the source page has been used as a page of the integrated electronic document by said composition means;

input means for inquiring of a user an input of an instruction regarding updating the page of the integrated electronic document and deleting the page of the integrated electronic document in response to when the source page being used as the page of integrated electronic document is edited and then overwritten with the edited source page in the electronic source document by said editing means; and control means for controlling, in a case that updating the page of the integrated electronic document is instructed by a user using the input means, updating the page of the integrated electronic document corresponding to the edited source page of the electronic source document with the edited source page edited by said editing means and controlling, in the case that deleting the page of the integrated electronic document is instructed by said user using the input means, deleting the page of the integrated electronic document corresponding to the edited source page of the electronic source document, wherein the edited source page of the electronic source document is not deleted when the page of the integrated electronic document corresponding to the edited source page of the electronic source document is deleted.

2. The apparatus according to claim 1, wherein said editing means includes at least movement, erase, copy, and rotation of each page of the integrated electronic document.

3. The apparatus according to claim 1, wherein the apparatus further comprises display control means for controlling display of a first display window for displaying a thumbnail image of each source page of each electronic source document and a second display window for displaying a thumbnail image of each page of the integrated electronic document, wherein said editing means edits each page of the integrated electronic document using the thumbnail image displayed on the first display window and the second display window, and wherein said display control means updates display contents of the second display window on the basis of the editing result by said editing means.

4. The apparatus according to claim 3, wherein said selection means selects the desired source page from the source pages of the plurality of kinds of electronic source documents using the thumbnail image displayed on the first display window.

5. The apparatus according to claim 1, wherein said editing means further controls to edit the electronic source document including the electronic source page being used as the page of the integrated electronic document.

6. An information processing apparatus according to claim 1, said apparatus further comprising:

addition means for adding the information of the source page selected by said selection means to the integrated electronic document, the integrated electronic document being composed of link information that link to the selected source pages; and second editing means for editing the page added by said addition means on the basis of an adding position.

7. The apparatus according to claim 6, wherein said editing means edits the page added by said addition means on the basis of a direction of the page of the integrated electronic document before the adding position and a direction of the page of the integrated electronic document after the adding position.

8. The apparatus according to claim 6, wherein said editing means comprises:

rotation means for rotating the page added by said addition means on the basis of a direction of the page of the integrated electronic document before the adding position and a direction of the page of the integrated electronic document after the adding position; and magnification means for magnifying the page rotated by said rotation means.

9. The apparatus according to claim 6, wherein said addition means adds the source page to the integrated electronic document composed of the source pages on the basis of a selection order of the source page selected by said selection means.

10. The apparatus according to claim 6, wherein said addition means adds a plurality of source pages to the integrated electronic document composed of the source pages on the basis of a page order of the plurality of source pages simultaneously selected by said selection means.

11. An information processing method of composing an integrated electronic document, said method comprising:

a holding step of holding a plurality of kinds of electronic source documents in a storage medium, each of the electronic source documents including a plurality of source pages;

a selection step of selecting at least one desired source page from the plurality of source pages included in the plurality kinds of electronic source documents held in the storage medium in the holding step;

a composition step of composing the integrated electronic document on the basis of at least one source page selected in the selection step, wherein the integrated electronic document is composed of link information that links to the selected source page, the selected source page being used as a page of the integrated electronic document;

an editing step of controlling to edit and then overwrite with an edited source page, the source page in the electronic source document, wherein the source page has been used as a page of the integrated electronic document in said composition step;

an input step of inquiring of a user an input of an instruction regarding updating the page of the integrated electronic document and deleting the page of the integrated electronic document in response to when the source page being used as the page of integrated electronic document is edited and then overwritten with the edited source page in the electronic source document by said editing means; and a control step of controlling, in the case that updating the page of the integrated electronic document is instructed by said user in said input step, the page of the integrated electronic document corresponding to the edited source page of the electronic source document with the edited source page edited in said editing step and controlling, in the case that deleting the page of the integrated electronic document is instructed by said user in said input step, deleting the page of the integrated electronic document corresponding to the edited source page of the electronic source document, wherein the edited source page of the electronic source document is not deleted when the page of the integrated electronic document corresponding to the edited source page of the electronic source document is deleted.

12. The method according to claim 11, wherein the editing step includes at least movement, erase, copy, and rotation of each page of the integrated electronic document.

13. The method according to claim 11, further comprising:

a display control step of controlling display of a first display window for displaying a thumbnail image of each source page of each electronic source document and a second display window for displaying a thumbnail image of each page of the integrated electronic document, wherein in the editing step, each page of the integrated electronic document is edited using the thumbnail image displayed on the first display window and the second display window, and wherein in the display control step, display contents of the second display window are updated on the basis of the editing result in the editing step.

14. The method according to claim 13, wherein said editing step further controls to edit the electronic source document including the electronic source page being used as the page of the integrated electronic document.

15. The method according to claim 13, wherein in the selection step, the desired source page is selected from the source pages using the thumbnail image displayed on the first display window.

16. An information processing method according to claim 11, said method further comprising:

an addition step of adding the information of the source page selected in the selection step to the integrated electronic document, the integrated electronic document being composed of link information that link to the selected source pages; and a second editing step of editing the page to be added in said addition step on the basis of an adding position.

17. The method according to claim 16, wherein in the editing step, the page added in said addition step is edited on the basis of a direction of the page of the integrated electronic document before the adding position and a direction of the page of the integrated electronic document after the adding position.

18. The method according to claim 16, wherein the editing step comprises:
   a rotation step of rotating the page added in said addition step on the basis of a direction of the page of the integrated electronic document before the adding position and a direction of the page of the integrated electronic document after the adding position; and
   a magnification step of magnifying the source page rotated in the rotation step.

19. The method according to claim 16, wherein in the addition step, the source page is added to the integrated electronic document composed of the source pages on the basis of a selection order of the source page selected in the selection step.

20. The method according to claim 16, wherein in the addition step, a plurality of source pages are added to the integrated electronic document composed of the source pages on the basis of a page order of the plurality of source pages simultaneously selected in the selection step.

21. A computer-readable memory which stores program codes of information processing for composing an integrated electronic document composed of a plurality of kinds of electronic source documents, comprising:
   a program code of a holding step of holding the plurality of kinds of electronic source documents in a storage medium;
   a program code of a selection step of selecting a desired electronic source document page from electronic source document pages of the plurality of kinds of electronic source documents held in the storage medium in the holding step;
   a program code of a composition step of composing the integrated electronic document on the basis of the electronic source document page selected in the selection step;
   a program code of an editing step of controlling to edit and then overwrite with an edited source page, the source page in the electronic source document, wherein the source page has been used as a page of the integrated electronic document in said composition step;
   a program code of an input step of inquiring of a user an input of an instruction regarding updating the page of the integrated electronic document and deleting the page of the integrated electronic document in response to when the source page being used as the page of integrated electronic document is edited and then overwritten with the edited source page in the electronic source document by said editing means; and
   a program code of the control step of controlling, in the case that updating the page of the integrated electronic document is instructed by said user in said input step, updating the page of the integrated electronic document corresponding to the edited source page of the electronic source document with the edited source page edited in said editing step and controlling, in the case that deleting the page of the integrated electronic document is instructed by said user in said input step, the page of the integrated electronic document corresponding to the edited source page of the electronic source document, wherein the edited source page of the electronic source document is not deleted when the page of the integrated electronic document corresponding to the edited source page of the electronic source document is deleted.

22. A computer-readable memory which stores program codes according to claim 21, the program codes further comprising:
   a program code of an addition step of adding the information of the source page selected in the selection step to the integrated electronic document, the integrated electronic document being composed of the link information that link to the selected source pages; and
   a program code of a second editing step of editing the page to be added in said addition step on the basis of an adding position.

* * * * *